US009823617B2

(12) United States Patent
Shimura et al.

(10) Patent No.: US 9,823,617 B2
(45) Date of Patent: Nov. 21, 2017

(54) POWER SUPPLY APPARATUS AND IMAGE FORMING APPARATUS

(71) Applicant: CANON KABUSHIKI KAISHA, Tokyo (JP)

(72) Inventors: Yasuhiro Shimura, Yokohama (JP); Masatoshi Itoh, Mishima (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/267,747

(22) Filed: Sep. 16, 2016

(65) Prior Publication Data
US 2017/0090395 A1 Mar. 30, 2017

(30) Foreign Application Priority Data

Sep. 30, 2015 (JP) ................... 2015-194770

(51) Int. Cl.
*G03G 15/00* (2006.01)
*H02M 3/04* (2006.01)
(Continued)

(52) U.S. Cl.
CPC ......... *G03G 15/80* (2013.01); *G03G 15/2039* (2013.01); *H02M 3/04* (2013.01);
(Continued)

(58) Field of Classification Search
CPC ... G01R 19/165; H02M 1/10; G03G 15/5004; G03G 15/80; G03G 15/0856
(Continued)

(56) References Cited

U.S. PATENT DOCUMENTS 5,942,882 A * 8/1999 Ohta .................. G03G 15/2003
 323/282
7,483,644 B2 * 1/2009 Uchiyama ................ H02J 3/02
 399/37
(Continued)

FOREIGN PATENT DOCUMENTS

JP 2007-212503 8/2007
JP 2013-123348 6/2013

OTHER PUBLICATIONS

U.S. Appl. No. 15/249,848, filed Aug. 29, 2016.
U.S. Appl. No. 15/174,222, filed Jun. 6, 2016.

*Primary Examiner* — Rajnikant Patel
(74) *Attorney, Agent, or Firm* — Fitzpatrick, Cella, Harper & Scinto

(57) ABSTRACT

The power supply apparatus includes a first line and a second line to each of which an AC voltage is input from an AC power supply; a conversion element configured to convert the AC voltage to be input to the first line or the second line into a current corresponding to the AC voltage; a voltage detection unit including a first current transformer, the first current transformer including a primary winding and a secondary winding, the voltage detection unit being configured to detect an AC voltage output from the secondary winding of the first current transformer through supply of the current converted by the conversion element to the primary winding; and a zero cross detection unit configured to detect a zero cross timing of the AC power supply based on the AC voltage detected by the voltage detection unit.

21 Claims, 13 Drawing Sheets

(51) Int. Cl.
*H02M 7/04* (2006.01)
*H02M 5/293* (2006.01)
*G03G 15/20* (2006.01)
*H02M 1/00* (2006.01)

(52) U.S. Cl.
CPC ............ *H02M 5/293* (2013.01); *H02M 7/04* (2013.01); *G03G 15/2053* (2013.01); *H02M 2001/0058* (2013.01)

(58) Field of Classification Search
USPC .............. 399/27, 37, 61, 69, 88; 363/16, 17, 363/21.01–21.08
See application file for complete search history.

(56) References Cited

U.S. PATENT DOCUMENTS

| | | | |
|---|---|---|---|
| 8,606,136 B2* | 12/2013 | Shimura | G01R 19/165 399/67 |
| 8,761,631 B2 | 6/2014 | Shimura | |
| 2009/0154942 A1* | 6/2009 | Hotogi | G03G 15/0851 399/27 |
| 2013/0250625 A1* | 9/2013 | Yamaguchi | H02M 3/33507 363/21.02 |

* cited by examiner

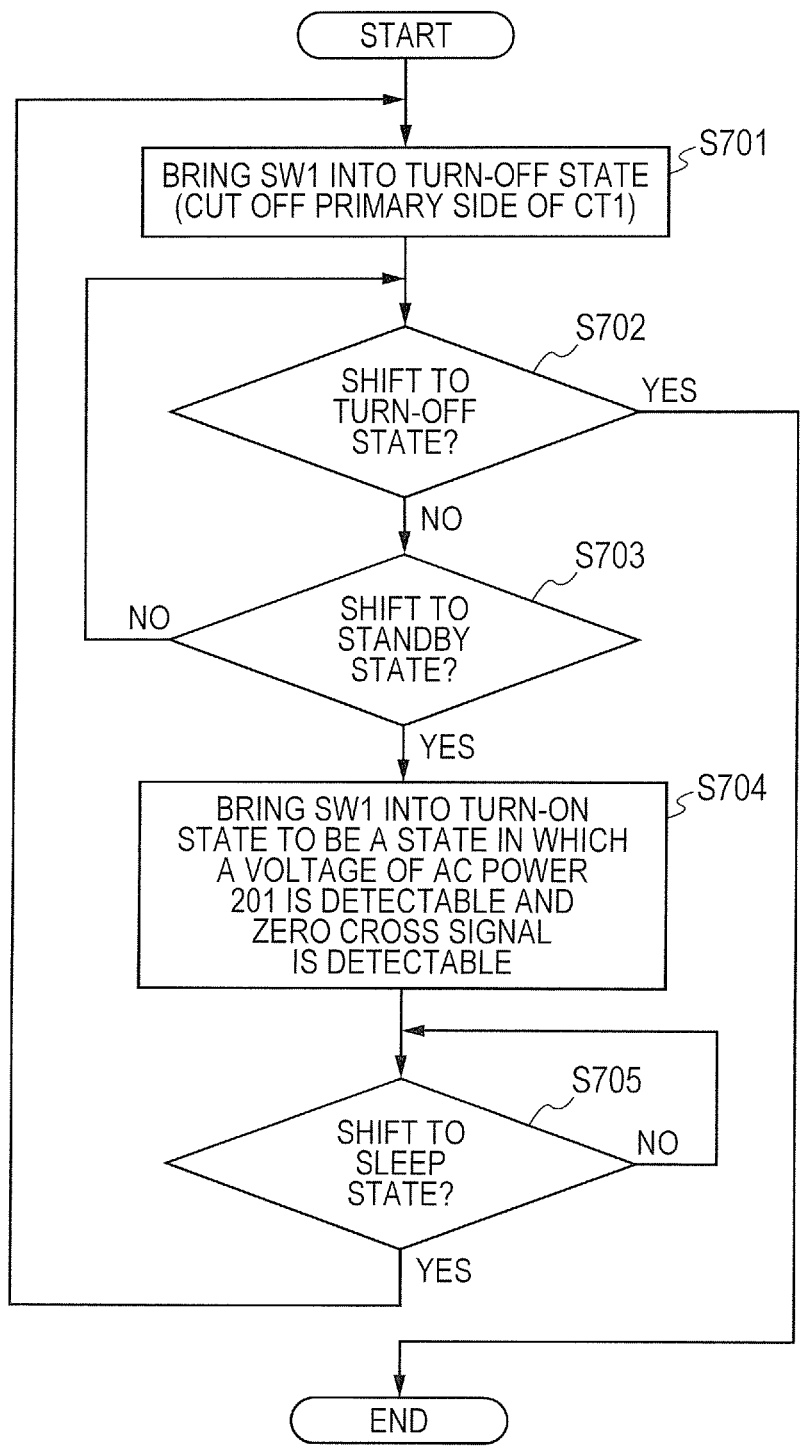

POWER SUPPLY APPARATUS AND IMAGE FORMING APPARATUS

BACKGROUND OF THE INVENTION

Field of the Invention

The present invention relates to a power supply apparatus, which is suitable for controlling a heat fixing device mounted in an image forming apparatus such as an electrophotographic copying machine or a printer.

Description of the Related Art

In an image forming apparatus such as an electrophotographic copying machine or a printer, there is provided a heat fixing device configured to heat and press an unfixed toner image onto a recording material to fix the unfixed toner image on the recording material. In a power supply apparatus configured to control supply of power to the heat fixing device, there has been widely used a method of controlling AC voltage, which is supplied from an AC power supply, using a bidirectional thyristor (hereinafter referred to as "triac") or the like. As for major functions of the above-mentioned power supply apparatus, the following technologies have been proposed. For example, in Japanese Patent Application Laid-Open No. 2007-212503, there is proposed a technology of detecting a current effective value of current which flows to the heat fixing device, to thereby detect power supplied to the heat fixing device. Further, for example, in Japanese Patent Application Laid-Open No. 2013-123348, there is proposed a technology of detecting an accurate zero cross timing of an AC power supply while reducing power consumption of a circuit for detecting a reference timing (zero cross timing) during a phase control for power supplied from the AC power supply.

With regard to the power supply apparatus, highly accurate power supply control with respect to the heat fixing device is required. Thus, there has been a demand to achieve, at low cost, high calculation accuracy at the time of setting power to be supplied to the heat fixing device and highly accurate power supply timing.

SUMMARY OF THE INVENTION

The present invention enables highly accurate power supply control to be performed with a simple circuit configuration.

In order to solve the above-mentioned problem, an object of the present invention is to provide a power supply apparatus, which is configured to supply power to a load, including: a first line and a second line to each of which an AC voltage is input from an AC power supply; a conversion element configured to convert the AC voltage to be input to the first line or the second line into a current corresponding to the AC voltage; a voltage detection unit including a first current transformer, the first current transformer including a primary winding and a secondary winding, the voltage detection unit being configured to detect an AC voltage output from the secondary winding of the first current transformer through supply of the current converted by the conversion element to the primary winding; and a zero cross detection unit configured to detect a zero cross timing of the AC power supply based on the AC voltage detected by the voltage detection unit.

Further features of the present invention will become apparent from the following description of exemplary embodiments with reference to the attached drawings.

BRIEF DESCRIPTION OF THE DRAWINGS

FIG. 7 is a flowchart for illustrating a control sequence for the power supply apparatus according to the second embodiment.

DESCRIPTION OF THE EMBODIMENTS

Now, embodiments of the present invention are described in detail with reference to the drawings.

A first embodiment of the present invention is described.

[Configuration of Image Forming Apparatus]

Figure 1:
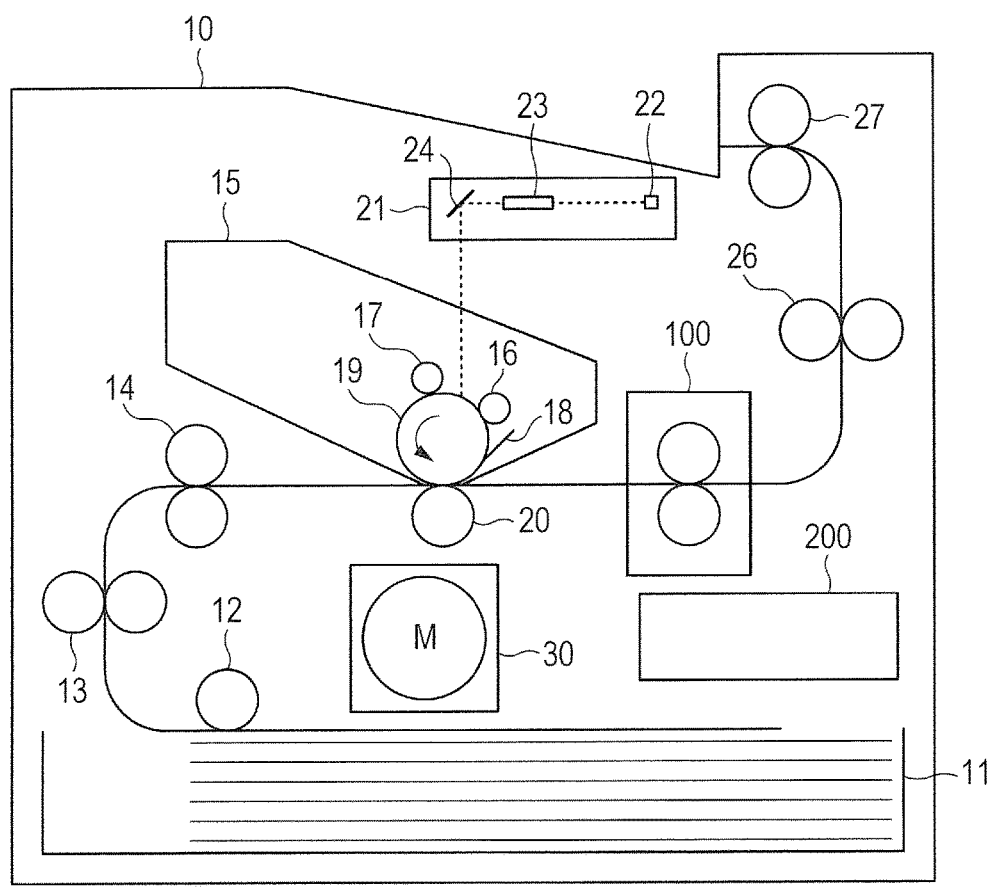
FIG. 1 is a view for illustrating a schematic configuration of image forming apparatus including a power supply apparatus according to a first embodiment to a fifth embodiment of the present invention.

FIG. 1 is a sectional view for illustrating a schematic configuration of a monochromatic printer, which is one example of an electrophotographic image forming apparatus 10 and is configured to perform image formation using black toner. In FIG. 1, only one of recording sheets serving as recording materials stacked on a sheet feeding cassette 11 is fed by a pickup roller 12 from the sheet feeding cassette 11 and conveyed by sheet feeding rollers 13 to registration rollers 14. Then, the recording sheet having been conveyed to the registration rollers 14 is further conveyed to a process cartridge 15 at a predetermined timing. The process cartridge 15 serving as an image forming unit is collectively constructed by a charging device 16, a developing roller 17 serving as a developing unit, a cleaner 18 serving as a cleaning unit, and a photosensitive drum 19 serving as a photosensitive member, which is configured to rotate in a direction indicated by the arrow (counter-clockwise direction) of FIG. 1. Then, through a series of well-known electrophotographic processes described below, an unfixed toner image is formed on the recording sheet having been conveyed. The photosensitive drum 19 is uniformly charged on its surface by the charging device 16 and thereafter exposed with light based on an image signal by a scanner unit 21 serving as an exposure unit. Laser light emitted from a laser diode 22 in the scanner unit 21 is deflected by a rotary polygon mirror 23 and passes through a reflection mirror 24 to scan the photosensitive drum 19, to thereby form a latent image on the photosensitive drum 19. The developing roller 17 causes toner to adhere on the latent image formed on the photosensitive drum 19, with the result that the latent image is formed into a visible toner image. Then, the toner image on the photosensitive drum 19 is transferred by the transfer roller 20 onto the recording sheet having been conveyed from the registration rollers 14. The recording sheet having the toner image transferred thereon is conveyed to a heat fixing device 100 (hereinafter referred to as "fixing device 100"). The unfixed toner image on the recording sheet (on the recording material) is heated and pressed by the fixing device 100 to be fixed on the recording sheet. Then, the recording sheet is delivered to an outside of the image forming apparatus 10 by intermediate sheet delivery rollers 26 and sheet delivery rollers 27, and then the series of printing operations is terminated.

A motor 30 gives a drive force to a drive system for each device, such as the fixing device 100. A power supply apparatus 200 is a power supply apparatus which is used in the image forming apparatus 10 and connected to an AC power supply 201, such as a commercial power supply, through a power supply cable (not shown) (see FIG. 2). An image forming apparatus to which the power supply apparatus 200 is applicable is not limited to the image forming apparatus illustrated in FIG. 1 and may be an image forming apparatus, such as a color printer including a plurality of image forming units. Further, the image forming apparatus may further include a primary transfer portion configured to transfer a toner image on the photosensitive drum 19 onto an intermediate transfer belt and a secondary transfer portion configured to transfer the toner image on the intermediate transfer belt onto a recording sheet. Further, the power supply apparatus 200 performs a duty control for a switching element such as a triac through use of control methods such as a phase control and a wave number control, to thereby perform a control for power to be supplied to the fixing device 100. In this embodiment, the triac is used as the switching element. However, for example, the control for power to be supplied to the fixing device 100 may be performed through use of a switching circuit such as an inverter.

[Configuration of Power Supply Apparatus]

Figure 2:
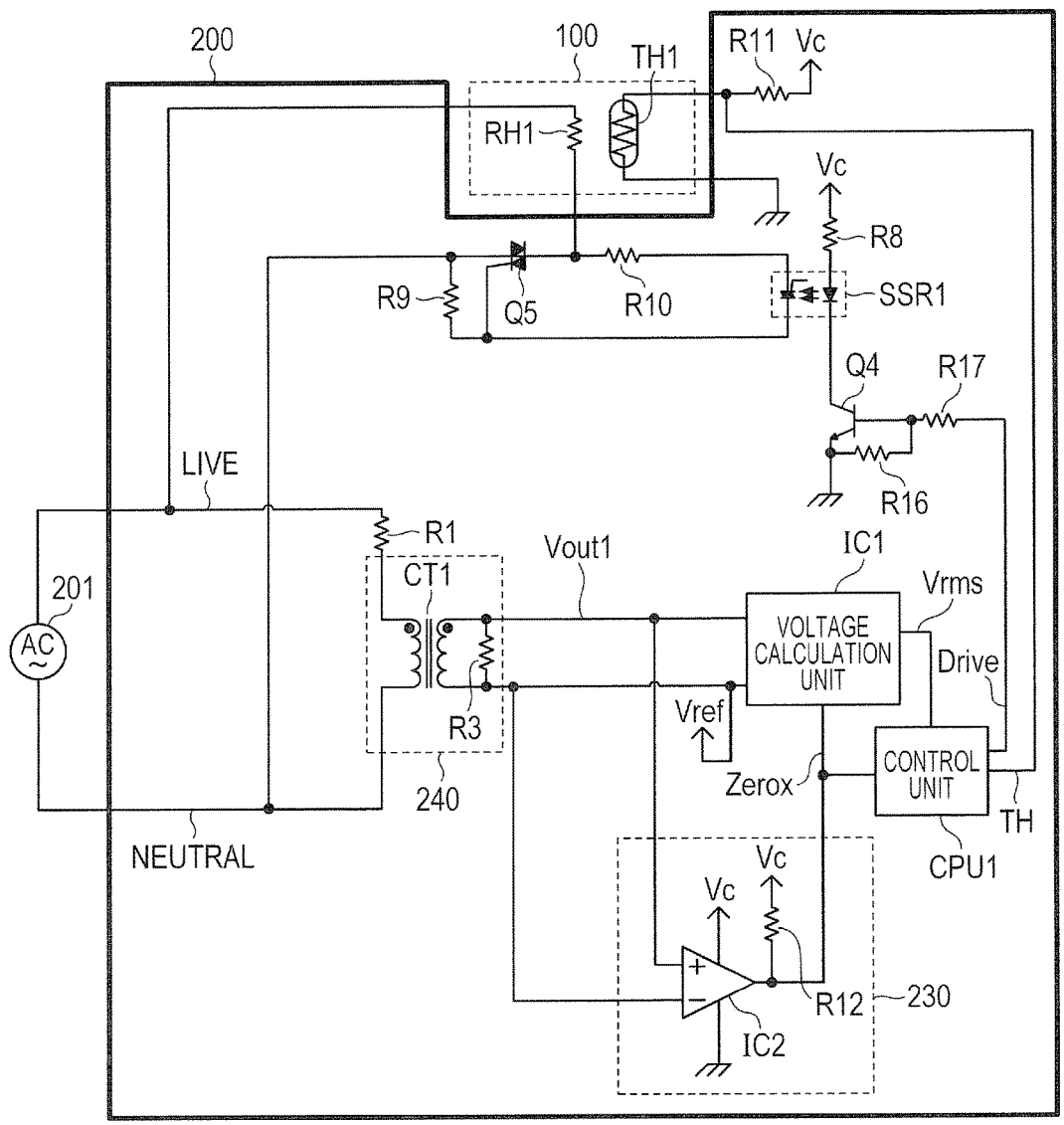
FIG. 2 is a diagram for illustrating a circuit configuration of the power supply apparatus according to the first embodiment.

FIG. 2 is a diagram for illustrating a circuit configuration of the power supply apparatus 200 according to the first embodiment. An AC power supply 201 (denoted by "AC" in FIG. 2) outputs an AC voltage between a live-side line (denoted by "LIVE" in FIG. 2) serving as a first line or a second line and a neutral-side line (denoted by "NEUTRAL" in FIG. 2) serving as a second line or a first line. A resistor R1 is arranged on a current path between the live-side line and a current transformer CT1 described later. The resistor R1 is a voltage detection resistor for use in detection of an input voltage from the AC power supply 201, and is a conversion element configured to convert the input voltage from the AC power supply 201 into a current proportional to the input voltage. Specifically, a current proportional to an inverse of a resistance value (predetermined fixed value) of the resistor R1 and to a voltage value of the AC power supply 201 flows to a primary side of the current transformer CT1. As the resistor serving as the conversion element described above, a plurality of resistors connected in series may be used. For example, resistors may be arranged between terminals on both sides of the current transformer CT1 and between the first line and the second line, respectively.

A voltage detection unit 240 serving as a voltage detector configured to detect an AC voltage of the AC power supply 201 is constructed by the current transformer CT1 serving as a first current transformer and a damping resistor R3. The resistor R1 has one end connected to the live-side line and another end connected to one end of a primary winding of the current transformer CT1. The primary winding has another end connected to the neutral-side line. The resistor R1 having a predetermined resistance value causes a current to flow to a primary winding side of the current transformer CT1. The current is proportional to an input voltage (AC voltage) from the AC power supply 201, and is applied between the live-side line and the neutral-side line. Further, a current proportional to a current on the primary side flows to the secondary winding side of the current transformer CT1. Thus, a voltage Vout1 generated by the damping resistor R3 is a voltage proportional to the input voltage from the AC power supply 201, and hence the input voltage from the AC power supply 201 can be detected.

Then, the voltage Vout1 and a predetermined reference voltage Vref are input to a voltage calculation unit IC1 serving as a voltage calculation device. In the voltage calculation unit IC1, an average value of a square value of a differential value between the output voltage Vout1 and the reference voltage Vref of the current transformer CT1 is calculated, to thereby calculate a square value of a voltage effective value of the input voltage from the AC power supply 201. Further, in the voltage calculation unit IC1, a voltage effective value of the AC power supply 201, a voltage average value of the AC power supply 201, or the like may be calculated. The voltage calculation unit IC1 calculates the square value of the voltage effective value of the AC power supply 201 at a half cycle of the AC power supply 201 and at cycles of integer multiples thereof based on a Zerox signal described later. Details thereof are described with reference to FIG. 3A, FIG. 3B, and FIG. 3C. In the voltage calculation unit IC1, the square value of the voltage effective value of the AC power supply 201 may be calculated in a predetermined period (for example, a period of one second) which is not in synchronization with the Zerox signal described later.

The voltage calculation unit IC1 is configured to output information of the calculated square value of the voltage effective value as a Vrms signal to a control unit CPU1 serving as a control device. The control unit CPU1 (hereinafter referred to as "CPU1") is a calculation control device used as a control unit for the power supply apparatus 200, and may be used in a control for the image forming apparatus 10 of FIG. 1. The power supply apparatus 200 includes a DC/DC converter (not shown) configured to have a DC voltage, which is generated by rectifying and smoothing the AC voltage input from the AC power supply 201, as an input voltage. The DC/DC converter (not shown) is configured to output a voltage Vc as an output voltage, and the voltage Vc is supplied to each circuit of the power supply apparatus 200. The power supply apparatus described in the following embodiments also include a similar DC/DC converter (not shown), and the voltage Vc is supplied in the power supply apparatus.

(Supply of Power to Fixing Device)

Next, a method of supplying power to a resistor heat generation member RH1 (hereinafter referred to as "heat generation member RH1") serving as a heater portion for the fixing device 100 of FIG. 2 is described. The CPU1 is configured to control supply of power to the heat generation member RH1 serving as the heater portion for the fixing device 100 in accordance with a drive signal. When the supply of power to the heat generation member RH1 being a load is to be performed, the CPU1 sets the drive signal at a high level. When the supply of power to the heat generation member RH1 is to be stopped, the CPU1 sets the drive signal at a low level. A transistor Q4 is brought into an on-state when the drive signal from the CPU1 is at the high level, and is brought into an off-state when the drive signal is at the low level. Resistors R17 and R16 are resistors configured to drive the transistor Q4.

A secondary-side light emitting diode of a phototriac coupler SSR1 (hereinafter referred to as "triac coupler SSR1") serving as a device configured to secure a creepage distance between the primary and secondary sides is turned on and off by the transistor Q4. Specifically, when the transistor Q4 is brought into the on-state, the secondary-side light emitting diode of the triac coupler SSR1 is brought into a conduction state, and current from the voltage Vc flows through a pull-up resistor R8, thereby causing emission of light. With this, when the primary-side triac of the triac coupler SSR1 is brought into the conduction state, a triac Q5 is brought into the conduction state. Accordingly, a current path (also serving as a power supply path) connecting the live-side line, the heat generation member RH1, the triac Q5, and the neutral-side line is formed. The triac Q5 maintains the on-state up to a zero cross timing of the input voltage from the AC power supply 201. Resistors R9 and R10 arranged between the triac Q5 and the primary-side triac of the triac coupler SSR1 are resistors configured to drive the triac Q5. Meanwhile, when the transistor Q4 is brought into the off-state, the secondary-side light emitting diode of the triac coupler SSR1 is brought into the non-conduction state, and the primary-side triac is also brought into the non-conduction state. With this, the triac Q5 is also brought into the non-conduction state, and supply of power from the AC power supply 201 to the heat generation member RH1 is cut off.

A temperature of the heat generation member RH1 of the fixing device 100 is detected by a thermistor TH1. Then, voltage obtained by dividing the voltage Vc by a resistance value of the thermistor TH1, which may vary in accordance with a temperature of the heat generation member RH1 and a resistance value of a resistor R11, is input to the CPU1 as a TH signal. Then, the CPU1 executes, for example, a PID control to calculate a power duty of power to be supplied to the heat generation member RH1 based on a temperature of the heat generation member RH1 detected by the thermistor TH1 in accordance with the input TH signal and a target set temperature of the heat generation member RH1. Then, the CPU1 converts the calculated power duty into a control level such as a corresponding phase angle (in the case of the phase control) or a wave number (in the case of the wave number control) and controls on/off states of the transistor Q4 with the drive signal based on the converted control condition. With this, the triac Q5 is controlled, to thereby control supply of power to the heat generation member RH1.

(Calculation of Amount of Power Supplied to Fixing Device)

Next, a method of calculating the amount of power being supplied to the fixing device 100 is described. The amount of power being supplied to the heat generation member RH1 of the fixing device 100 can be determined in accordance with a square value of a voltage effective value calculated by the voltage calculation unit IC1, a resistance value of the heat generation member RH1, and a power duty of power currently being supplied to the fixing device 100. For example, there are provided the voltage effective value of the AC power supply 201 being 100 Vrms, the resistance value of the heat generation member RH1 being 10Ω, and the power duty of power being supplied to the fixing device 100 being 100%. In this case, the power being supplied to the fixing device 100 has a value obtained by dividing a square value of the voltage effective value (=100 Vrms) by the resistance value (=10Ω) of the heat generation member RH1, resulting in a value of 1,000 W (=100 V×100 V×1/10Ω ("×1" in the expression indicates that the power duty is 100%)). Further, in a case where the power duty of power currently being supplied to the fixing device 100 is 50%, the power being supplied to the fixing device 100 is one-half, that is, 500 W(=100 V×100 V×0.5/10Ω ("×0.5" in the expression indicates that the power duty is 50%)).

[Zero Cross Detection]

Next, a method of detecting a zero cross of the AC power supply 201 is described. In this embodiment, as illustrated in FIG. 2, a zero cross detection unit 230 serving as a zero cross detection device is constructed by a comparator IC2. A non-inverting terminal (+) of a comparator IC2 receives an output voltage Vout1 of the current transformer CT1, and an inverting terminal (−) receives a reference voltage Vref of the current transformer CT1. Then, the comparator IC2 outputs a Zerox (zero cross) signal, which corresponds to a result of comparison between input voltages of the two terminals, to the voltage calculation unit IC1 and the CPU1, thereby enabling the CPU1 to detect a zero cross timing of the AC power supply 201. The zero cross detection utilizes a waveform of the AC voltage of a secondary-side output voltage Vout1 of the current transformer CT1.

Figure 3A:
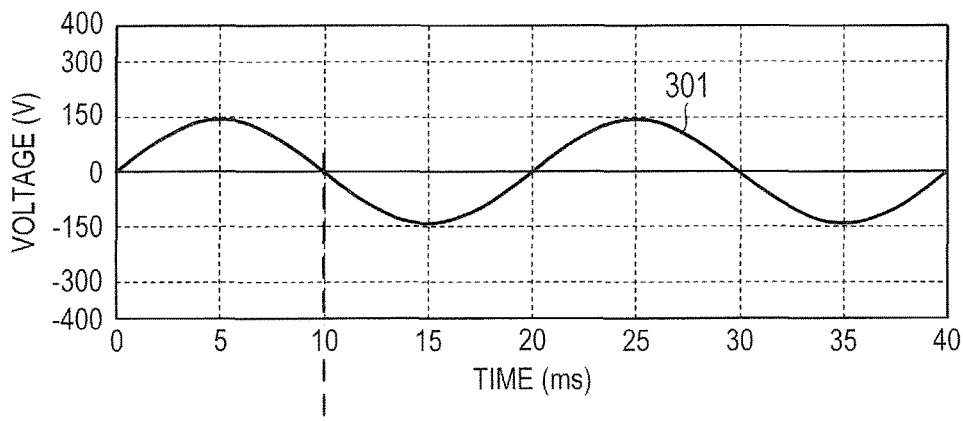
FIG. 3A, FIG. 3B, and FIG. 3C are diagrams for illustrating input and output waveforms of a zero cross detection circuit according to the first embodiment.
Figure 3B:
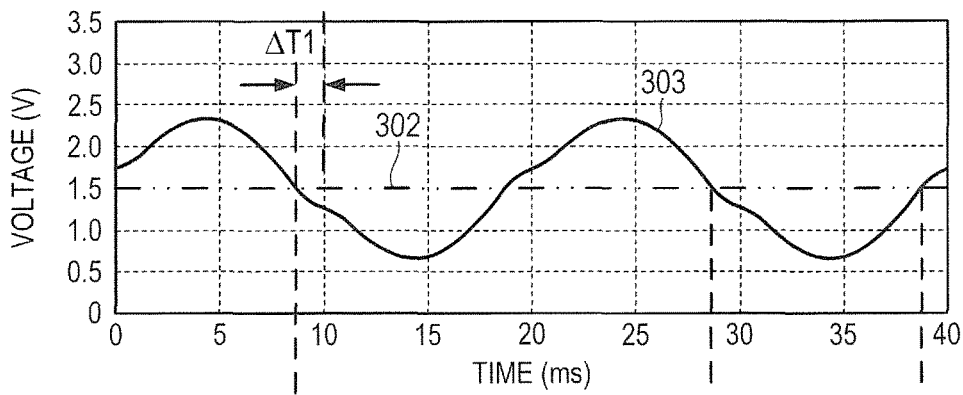
Figure 3C:
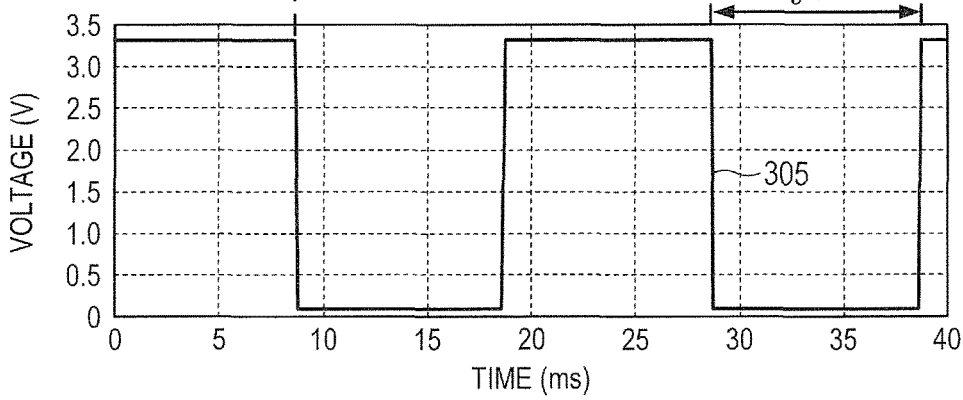

Next, the zero cross waveform is described with reference to the drawings. FIG. 3A, FIG. 3B, and FIG. 3C are diagrams for illustrating voltage waveforms of the AC voltage of the AC power supply 201, the output voltage Vout1 of the current transformer CT1, and the Zerox signal which is an output of the comparator IC2 according to this embodiment. FIG. 3A is a waveform diagram for illustrating a waveform 301 of an input voltage from the AC power supply 201. In FIG. 3A, the horizontal axis represents time (unit: ms (millisecond)), and the vertical axis represents voltage (unit: volt (V)). The vertical axis and the horizontal axis in each of FIG. 3B and FIG. 3C are the same as those of FIG. 3A, and hence description thereof is hereinafter omitted. The waveform 301 represents an input voltage waveform (100 Vrms, 50 Hz) of the AC power supply 201. One cycle is 20 ms, and peak voltages are about 141 V and about −141 V. Further, in FIG. 3A, the timings at which the voltage of the AC power supply 201 is zero volt, that is, the timings at 10 msec, 20 msec, 30 msec, and 40 msec are zero cross timings. Next, FIG. 3B is a diagram for illustrating a waveform 303 (solid line) which is a voltage waveform of the output voltage Vout1 of the current transformer CT1 and a waveform 302 (two-dot chain line) which is a voltage waveform of the reference voltage Vref of the current transformer CT1. A voltage waveform proportional to an AC voltage value of the AC voltage waveform which is the waveform 301 of the input voltage from the AC power supply input to the primary side of the current transformer CT1 is output to the waveform 303 which is the output voltage waveform on the secondary side of the current transformer CT1. Further, the reference voltage Vref represented by the waveform 302 is a predetermined voltage (1.5 V in FIG. 3B) output from a regulator (not shown).

FIG. 3C is an illustration of a waveform 305, which is a voltage waveform of a Zerox signal as an output of the comparator IC2. In FIG. 2, the non-inverting terminal (+) of the comparator IC2 receives the output voltage Vout1 of the current transformer CT1, and the inverting terminal (−) receives the reference voltage Vref of the current transformer CT1. Then, the comparator IC2 compares the input voltages to the two input terminals and outputs a Zerox signal based on a comparison result. Thus, in FIG. 3B, during the period in which the output voltage Vout is higher than the reference voltage Vref, the Zerox signal illustrated in FIG. 3C is at the high level. Meanwhile, during the period in which the output voltage Vout is lower than the reference voltage Vref, the Zerox signal illustrated in FIG. 3C is at the low level. The CPU1 can detect zero cross timings of the AC power supply 201 and the frequency of the AC power supply 201 based on the Zerox signal.

The output voltage Vout1 represented by the waveform 303 causes a phase leading amount $\Delta T1$ as compared to the waveform 301 which is the input voltage waveform of the AC power supply under the influence of a secondary side inductance of the current transformer CT1. Further, the voltage waveform of the Zerox signal represented by the waveform 305 generated based on the output voltage Vout1 represented by the waveform 303 also causes the phase leading amount $\Delta T1$, and hence a zero cross detection accuracy for the AC power supply 201 is degraded. Therefore, in the power supply apparatus 200 according to this embodiment, a triac coupler SSR1 which is an element having a zero cross synchronization function is used as a switching element configured to control the triac Q5. The triac coupler SSR1 is an element which is capable of switching to a conduction state in synchronization with zero cross timings of the AC power supply 201. The CPU1 uses the triac coupler SSR1 to perform a power control for power to be supplied to the fixing device 100 through the wave number control which does not require accurate detection of zero cross timings.

Incidentally, the output voltage Vout1 causes the phase leading amount $\Delta T1$ with respect to the waveform 301 which is the voltage waveform of the AC power supply 201, and hence deviation by the phase leading amount $\Delta T1$ may occur with respect to a correct timing when the voltage calculation unit IC1 calculates the square value of the voltage effective value of the output voltage Vout1. Thus, through use of the waveform 305 which is the Zerox signal and may cause the similar phase leading amount $\Delta T1$, an integration interval $\int T1$ (in this case, the negative half cycle of the AC power supply 201 is illustrated as an example) for the waveform 303 is determined. With this, the voltage calculation unit IC1 can perform calculation for the waveform 303 during an appropriate period in synchronization with the phase leading amount $\Delta T1$. Other than the half cycle ($\int T1$) of the AC power supply 201, when the square value of the voltage effective value at cycles of integer multiples of the half cycle of the AC power supply 201, such as the whole cycle of the AC power supply 201, is to be calculated, the method of using the waveform 305 which is the Zerox signal to set the integration interval for calculation is effective.

[Control Sequence for Power Supply Apparatus]

Figure 4:
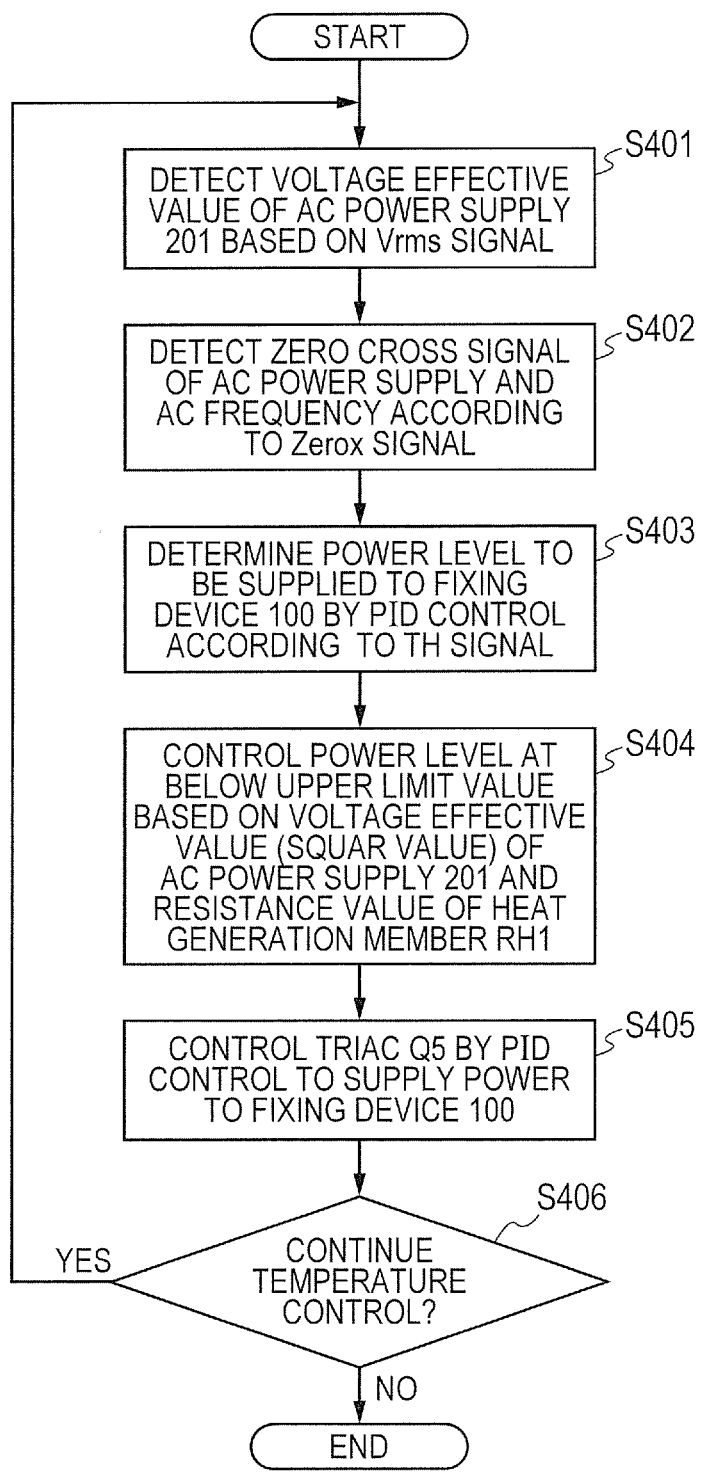
FIG. 4 is a flowchart for illustrating a control sequence for the power supply apparatus according to the first embodiment.

FIG. 4 is a flowchart for illustrating a control sequence for the power supply apparatus 200 according to this embodiment. The control sequence illustrated in FIG. 4 is activated when the power supply control by the power supply apparatus 200 to the heat generation member RH1 of the fixing device 100 is started. The control sequence is executed by the CPU1.

In Step S401, the CPU1 detects (a square value of) a voltage effective value of the AC power supply 201 based on the Vrms signal output from the voltage calculation unit IC1. In Step S402, the CPU1 detects a zero cross timing of the AC power supply 201 and an AC frequency (hereinafter also simply referred to as "frequency") of the AC power supply 201 based on a Zerox signal output from the comparator IC2. In Step S403, the CPU1 detects a temperature of the heat generation member RH1 of the fixing device 100 based on the TH signal indicating the temperature of the heat generation member RH1. Then, the CPU1 determines a power level (power duty) of power to be supplied to the fixing device 100 through a PID control or the like based on the detected temperature of the heat generation member RH1.

In Step S404, the CPU1 sets a limit to the power level (power duty) of power to be supplied to the fixing device 100 so as not to exceed a predetermined limit value based on (a square value of) a voltage effective value of the AC power supply 201 and a resistance value of the heat generation member RH1. In Step S405, the CPU1 controls the triac Q5 with a drive signal in accordance with a control pattern of the wave number control depending on the power level determined in Step S403, to thereby supply power to the fixing device 100. In Step S406, the CPU1 determines whether or not to continue a temperature control for the heat generation member RH1 of the fixing device 100. When the CPU1 determines that the temperature control is to be continued, the control returns to Step S401. When the CPU1 determines that the temperature control is not to be continued, processing is terminated.

As described above, the power supply apparatus 200 according to this embodiment has the following features.

1. Through use of the Zerox signal based on the output voltage Vout1 of the current transformer CT1, the integration interval subjected to the calculation with the voltage effective value, the voltage average value, the square value of the voltage effective value, or the like for the half cycle of the AC power supply 201 or the integer multiples thereof can be set appropriately.

2. Hitherto, the zero cross circuit has been required to be constructed on the primary side of the current transformer, and hence use of a high-voltage element has been required. Further, in order to notify the detected zero cross timing to the secondary side, the use of elements such as a photocoupler or the like enabling reinforced insulation has been required, and hence power has always been consumed. In this embodiment, the zero cross circuit can be constructed on the secondary side. Therefore, the zero cross circuit can be achieved with a simpler circuit configuration as compared to the related arts.

As described above, according to this embodiment, a highly accurate power supply control can be performed with a simple circuit configuration. With this, through use of the circuit configuration according to this embodiment, a power supply apparatus and an image forming apparatus having the voltage detection function and the zero cross detection function can be provided at low cost.

A second embodiment of the present invention is described.

[Configuration of Power Supply Apparatus]

Figure 5:
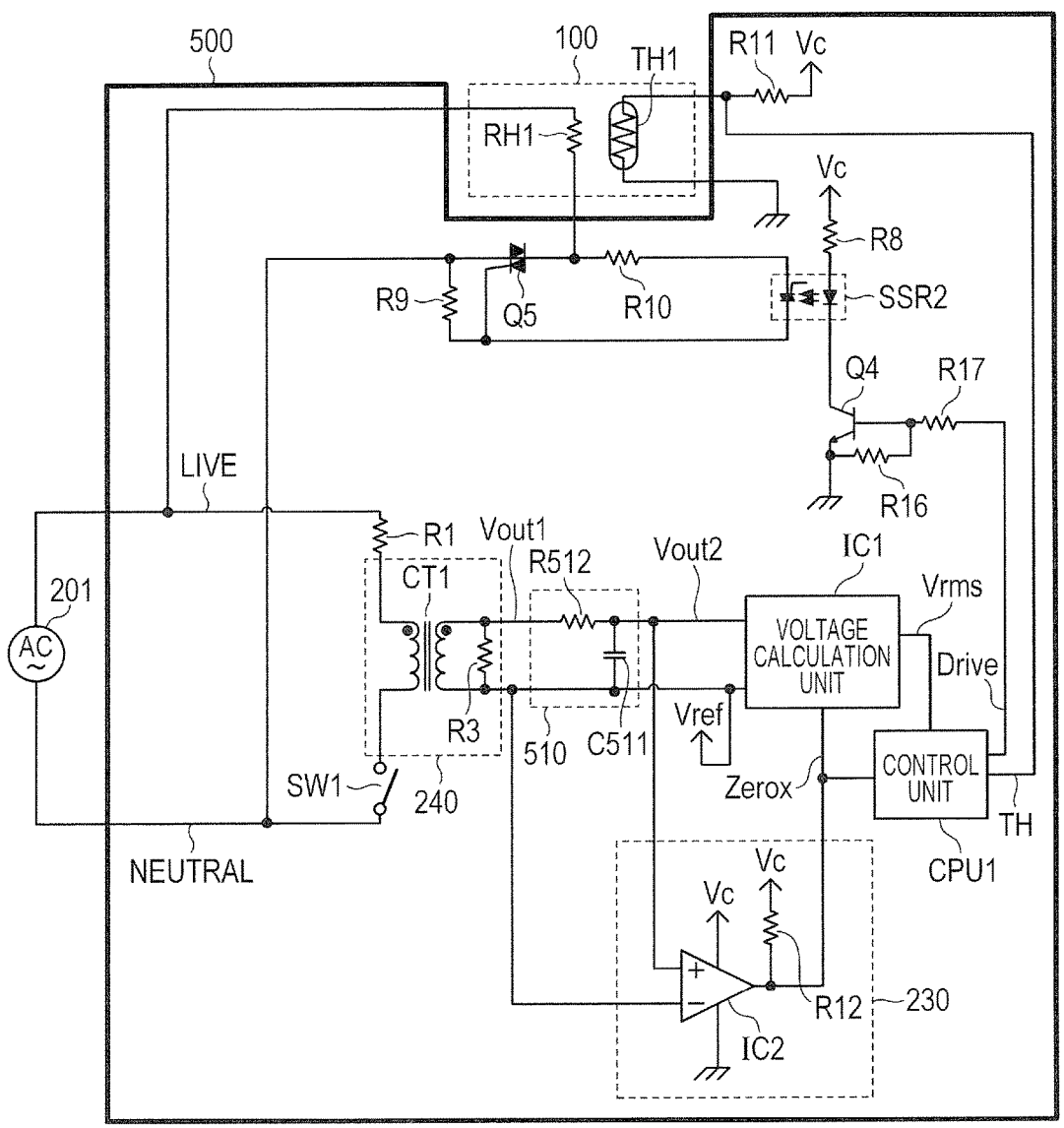
FIG. 5 is a diagram for illustrating a circuit configuration of the power supply apparatus according to the second embodiment.

FIG. 5 is a diagram for illustrating a circuit configuration of a power supply apparatus 500 according to the second embodiment. The circuit configuration illustrated in FIG. 5 is different from the circuit configuration of the first embodiment illustrated in FIG. 2 in that the following circuit is added. Specifically, in FIG. 5, at least one of a switch SW1 for a power-saving mode and a phase adjusting unit 510, which is arranged in a stage following the voltage detection unit 240 to improve the detection accuracy for the zero cross timing, is added. In FIG. 5, there is illustrated a configuration in which the switch SW1 and the phase adjusting unit 510 are both added. Other circuit configuration is the same as the circuit configuration of the first embodiment illustrated in FIG. 2. Thus, the same reference symbols are used for the same configurations, and description herein is omitted.

(Switch SW1)

First, an operation in the power-saving mode by the switch SW1 serving as a switching device is described. Under a state in which voltage detection and zero cross detection for the AC power supply 201 can be performed, such as during a standby mode in which the power supply apparatus 500 can supply power to the fixing device 100 or during printing of the image forming apparatus 10, the switch SW1 is brought into an on-state, thereby attaining the conduction state. With this, a current proportional to an input voltage value (AC voltage value) of the AC power supply 201 flows to the primary side of the current transformer CT1, thereby leading to the state in which the input voltage from the AC power supply 201 can be detected. The CPU1 brings the switch SW1 into the conduction state (on-state) with a control circuit (not shown) during the standby mode of the power supply apparatus 500 or during printing of the image forming apparatus 10.

Meanwhile, under a power-saving state in which power consumption is suppressed, such as during the power-off state of the power supply apparatus 500 or during the sleep state of not performing supply of power to the fixing device 100, the switch SW1 is brought into an off-state, thereby attaining a disconnected state. In this state, a current does not flow to the primary side of the current transformer CT1, and hence power consumption of the voltage detection resistor R1 can be reduced. Thus, power consumption during the power-off state or the sleep state can be reduced.

Incidentally, the related-art zero cross detection circuits require a circuit using a high-voltage switching element on the primary side in order to reduce power consumption of the zero cross detection circuit during the power-saving mode. Meanwhile, according to the configuration according to this embodiment, the switch SW1 disconnects the current path for a current which flows through the primary winding of the voltage detection unit 240, thereby being capable of reducing the standby power consumption in circuits of both the voltage detection unit 240 and the zero cross detection unit 230. Thus, the configuration according to this embodiment to perform the zero cross detection with use of the switch SW1 and the output voltage Vout1 on the secondary side of the current transformer CT1 is effective for reduction of cost and reduction of the number of parts in the circuit.

(Phase Adjusting Unit)

Next, the phase adjusting unit 510 serving as a first phase adjusting unit for the output voltage Vout1 of the current transformer CT1 is described. As described above, the waveform of the output voltage Vout1 of the current transformer CT1 in the voltage detection unit 240 may cause the phase leading amount ΔT1 with respect to the waveform of the AC voltage from the AC power supply 201. In view of this, the phase adjusting unit 510 is a circuit which is arranged in a stage following the voltage detection unit 240 and configured to perform phase adjustment so as to reduce the phase deviation with the voltage waveform of the AC power supply 201 to improve the detection accuracy for the zero cross timing. The phase adjusting unit 510 is constructed by a resistor R512 and a capacitor C511. The phase adjusting unit 510 is configured to perform the phase adjustment with respect to the output voltage Vout1 input from the voltage detection unit 240, and the output voltage Vout2 obtained through the phase adjustment is output to the voltage calculation unit IC1 or the zero cross detection unit 230.

The phase adjusting unit 510 according to this embodiment is illustrated with an example in which adjustment is performed so as to correspond to a frequency of 50 Hz in the AC power supply 201. However, the adjustment may be performed so as to correspond to, for example, 60 Hz depending on the frequency of the AC power supply 201. Further, when the power supply apparatus 500 corresponds to a plurality of AC frequencies, that is, to both of 50 Hz and 60 Hz, the phase adjustment amount of the phase adjusting unit 510 is set to be the frequency of from 50 Hz to 60 Hz (for example, 55 Hz). With this, the phase deviation of the zero cross by the phase leading amount ΔT1 can be reduced.

[Zero Cross Detection]

Figure 6A:
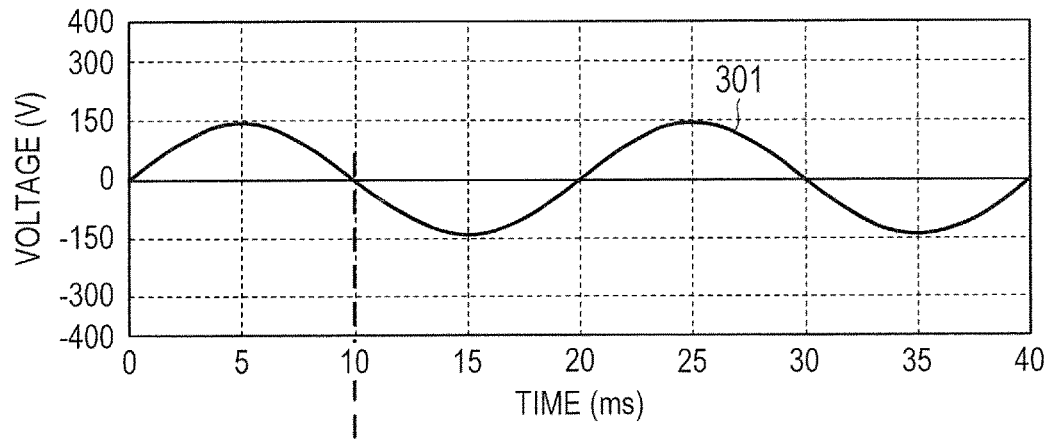
FIG. 6A, FIG. 6B, and FIG. 6C are diagrams for illustrating input and output waveforms of a zero cross detection circuit according to the second embodiment.
Figure 6B:
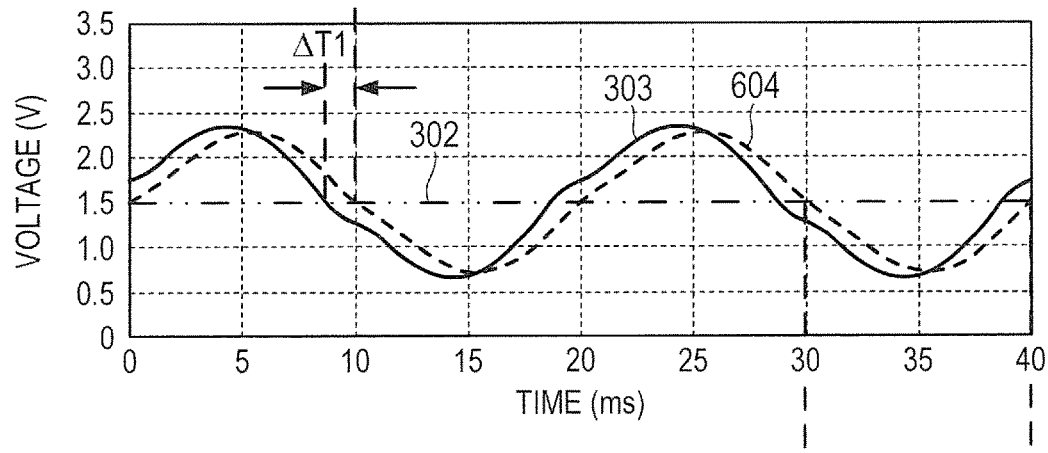
Figure 6C:
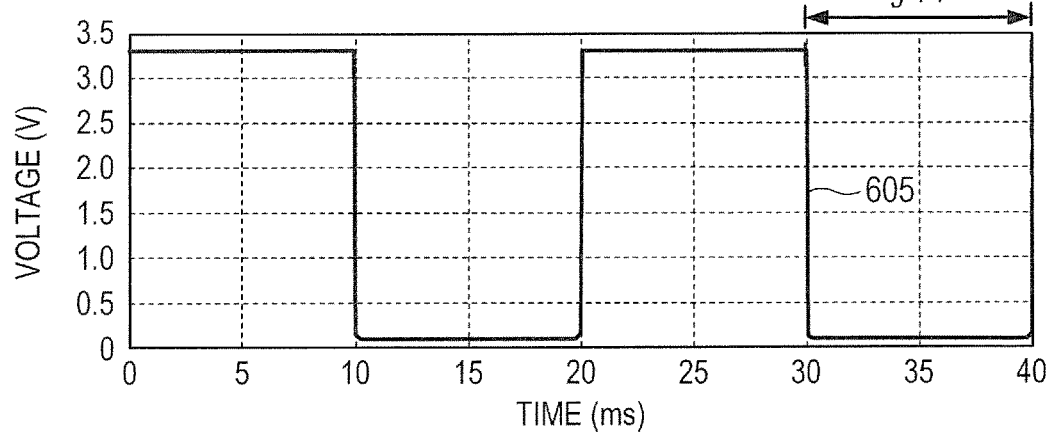

FIG. 6A, FIG. 6B, and FIG. 6C are diagrams for illustrating voltage waveforms of the AC voltage from the AC power supply 201, the output voltage Vout1 of the current transformer CT1, the output voltage Vout2 of the phase adjusting unit 510, and the Zerox signal which is an output of the comparator IC2 according to this embodiment. FIG. 6A is a waveform diagram for illustrating the waveform 301 of the input voltage from the AC power supply 201. FIG. 6B is an illustration of a waveform 303 (solid line) which is a voltage waveform of the output voltage Vout1 of the current transformer CT1, a waveform 302 (two-dot chain line) which is a voltage waveform of the reference voltage Vref, and a waveform 604 (broken line) which is a voltage waveform of the output voltage Vout2 of the phase adjusting unit 510. FIG. 6C is an illustration of a waveform 605 which is the voltage waveform of the Zerox signal which is an output of the comparator IC2.

As can be seen, the waveform 604 (broken line) representing the output voltage Vout2 is reduced (substantially eliminated) in the phase deviation with the waveform 301 of the AC power supply 201 as compared to the waveform 303 (solid line) causing the phase leading amount ΔT1 with respect to the waveform 301 which is the input voltage waveform of the AC power supply 201. Thus, in the Zerox signal which is an output signal of the comparator IC2 represented by the waveform 605, the zero cross timings substantially coincide with the zero cross timings of the AC power supply 201. With this, the detection accuracy for the zero cross timing can be improved with the phase adjusting unit 510.

When the phase control is used in the power control for the fixing device 100, a phase angle for bringing the triac Q5 into the conduction state needs to be controlled with the zero cross timing of the AC power supply 201 as a reference. Thus, when the phase control is used, accurate detection for the zero cross timing is required. The method using the phase adjusting unit 510 according to this embodiment is effective when the control method such as the phase control requiring accurate detection for zero cross timing of the AC power supply 201 is applied. In the configuration of the power supply apparatus 500 according to this embodiment, the triac coupler SSR2 is used as a photo triac coupler of a zero cross asynchronous type for an element configured to control conduction and non-conduction states of the triac Q5. The triac coupler SSR2 is an element which is capable of switching the triac Q5 into the conduction state even at the timing other than the zero cross timing of the AC power supply 201, and is to be used in a case where power to be supplied to the fixing device 100 is adjusted with the phase control as in this embodiment.

Incidentally, the waveform 604 of the output voltage Vout2 of the phase adjusting unit 510 may cause phase deviation with respect to the waveform 301 of the AC power supply 201 due to variation and the like in circuits. Thus, through use of the waveform 605 which is the Zerox signal causing similar phase leading in synchronization with the waveform 604, the integration interval ∫T1 of the waveform 604 (in this case, a negative half cycle of the AC power supply 201 is illustrated as an example) is determined. With this, the voltage calculation unit IC1 can perform calculation for the waveform 604 with appropriate periods. Other than the half cycle (∫T1) of the AC power supply 201, when the square value of the voltage effective value at cycles of integer multiples of the half cycle of the AC power supply 201, such as the whole cycle of the AC power supply 201, is to be determined, the method of setting the integration interval for calculation through use of the waveform 605 which is the Zerox signal is effective.

[Control Sequence for Power Supply Apparatus]

FIG. 7 is a flowchart for illustrating a control sequence for the power supply apparatus 500 according to this embodiment. When the power supply apparatus 500 is shifted to the power-on state through a power supply switch (not shown) arranged in the image forming apparatus 10, a connection with the AC power supply 201 through a power supply cable (not shown), or the like, the control sequence illustrated in FIG. 7 is activated and executed by the CPU1.

In Step S701, the CPU1 brings the switch SW1 into the off-state through a control circuit (not shown), and cuts off supply of current to the primary winding of the current transformer CT1. With this, the current transformer CT1 of the power supply apparatus 500 is brought into the non-conduction state, thereby being brought into the power-saving state.

In Step S702, the CPU1 determines whether or not there is a need to shift the power supply apparatus 500 to the power-off state. When the CPU1 determines that there is a need to shift the power supply apparatus 500 to the power-off state, the CPU1 terminates processing. When the CPU1 determines that there is no need to shift the power supply apparatus 500 to the power-off state, the CPU1 causes the processing to proceed to Step S703. In Step S703, the CPU1 determines whether or not there is a need to shift the power supply apparatus 500 to the standby state. When the CPU1 determines that there is a need to shift the power supply apparatus 500 to the standby state, the CPU1 causes the processing to proceed to Step S704. When the CPU1 determines that there is no need to shift the power supply apparatus 500 to the standby state, the CPU1 causes the processing to return to Step S702.

In Step S704, the CPU1 brings the switch SW1 into the on-state through a control circuit (not shown), and starts supply of current to the primary winding of the current transformer CT1. With this, the current transformer CT1 is brought into the conduction state, thereby being brought into the state in which the voltage detection by the voltage detection unit 240 and the detection of the zero cross timing by the zero cross detection unit 230 can be performed. Thus, the power supply control by the power supply apparatus 500 is started. The power supply control sequence of the power supply apparatus 500 is the same as the power supply control sequence of the power supply apparatus 200 described with reference to FIG. 4, and hence description herein is omitted.

In Step S705, the CPU1 determines whether or not there is a need to shift the power supply apparatus 500 to the sleep state. When the CPU1 determines that there is a need to shift the power supply apparatus 500 to the sleep state, the CPU1 causes the processing to return to Step S701. When the CPU1 determines that there is no need to shift the power supply apparatus 500 to the sleep state, the CPU1 causes the processing to return to Step S705.

As described above, the power supply apparatus 500 according to this embodiment has the following features.

1. Through use of the Zerox signal based on the output voltage Vout2 of the phase adjusting unit 510, the integration interval subjected to the calculation with the voltage effective value, the voltage average value, the square value of the voltage effective value, or the like for the half cycle of the AC power supply 201 or the integer multiples thereof can be set appropriately.

2. The zero cross circuit having hitherto been required to be constructed on the primary side of the current transformer CT1 can be constructed on the secondary side. Thus, the zero cross circuit can be achieved with a simple circuit configuration.

3. The current path to the primary winding of the current transformer CT1 is disconnected by the switch SW1, to thereby stop the voltage detection by the voltage detection unit 240 and the zero cross detection by the zero cross detection unit 230. The state is shifted to the power-saving state through the control for the switch SW1, thereby reducing the power consumption on the primary side of the voltage detection unit 240.

4. The detection accuracy for the zero cross timing of the AC power supply 201 can be improved by the phase adjusting unit 510. With this, the power supply control through the phase control requiring accurate detection of the zero cross timing can be performed.

As described above, according to this embodiment, the highly accurate power supply control can be performed with a simple circuit configuration.

Next, a third embodiment of the present invention is described.

[Configuration of Power Supply Apparatus]

Figure 8:
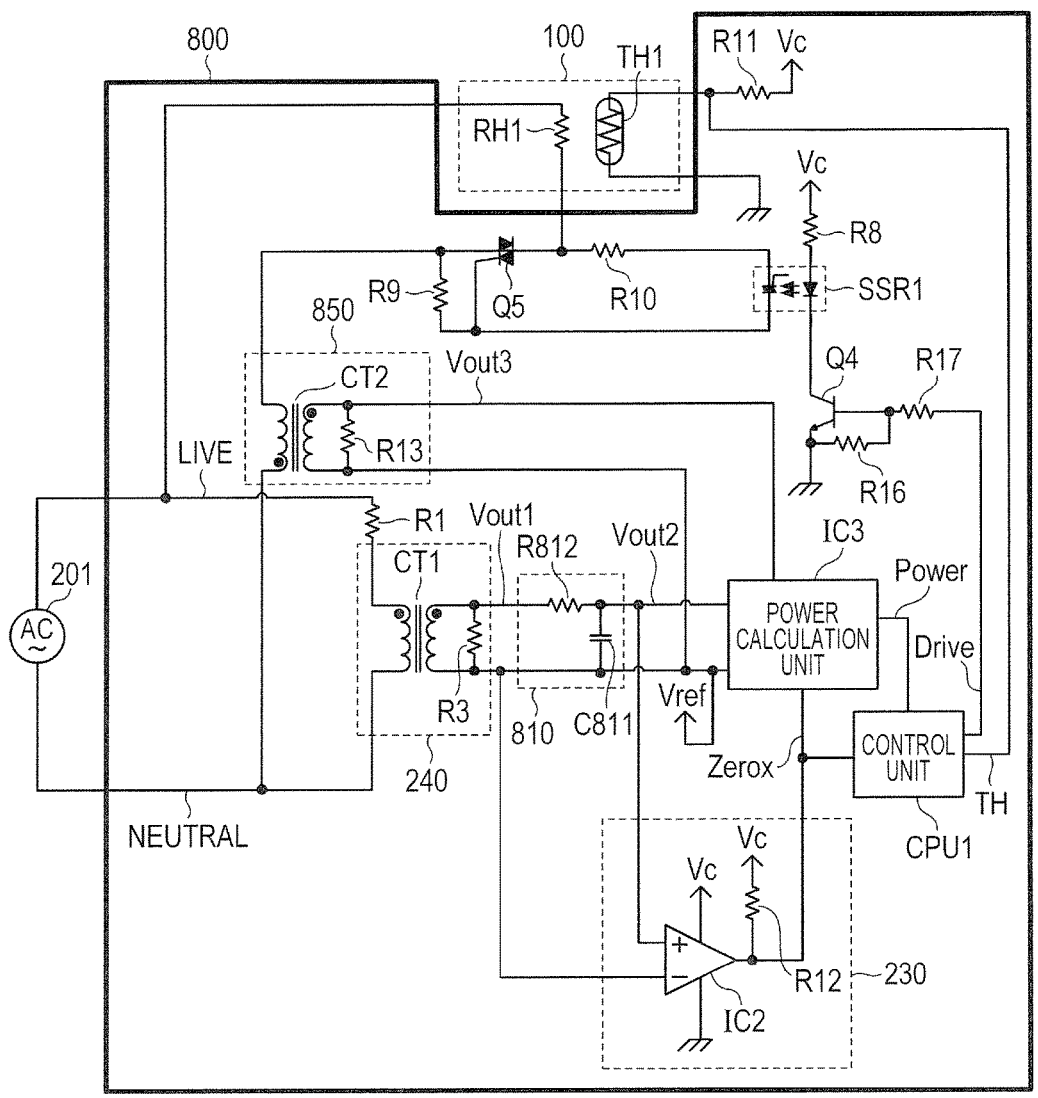
FIG. 8 is a diagram for illustrating a circuit configuration of a power supply apparatus according to the third embodiment.

FIG. 8 is a diagram for illustrating a circuit configuration of a power supply apparatus 800 according to the third embodiment. The circuit configuration illustrated in FIG. 8 is different from the circuit configuration illustrated in FIG. 2 according to the first embodiment in that the following circuit is added. Specifically, in FIG. 8, there is a difference in that, in order to detect power to be supplied to the fixing device 100, a current detection unit 850 configured to detect a current being supplied to the fixing current 100 and a phase adjusting unit 810 having a function different from that of the phase adjusting unit 510 are arranged. Further, in this embodiment, there is a difference in that the voltage calculation unit IC1 according to the first and second embodiments is replaced with a power calculation unit IC3. Although not illustrated in FIG. 8, the power-saving function may be provided through the configuration in which the switch SW1 for the power-saving mode is arranged as in the second embodiment. Thus, the same reference symbols are used for the same configurations, and description herein is omitted.

In order to detect a current being supplied to the fixing device 100, the current detection unit 850 serving as a current detection device is constructed by a current transformer CT2 serving as a second current transformer and a damping resistor R13. A primary winding of the current transformer CT2 has one end connected to the triac Q5 and another end connected to the neutral-side line. When the triac Q5 is in the conduction state, a current being supplied to the heat generation member RH1 of the fixing device 100 flows to the primary winding. Then, a current proportional to the current which flows to the heat generation member RH1 of the fixing device 100 is generated on the secondary side of the current transformer CT2. A voltage Vout3 generated in the damping resistor R13 by the current is a voltage proportional to the current which flows to the heat generation member RH1, and hence a current value of the current supplied to the fixing device 100 can be detected. Then, the output voltage Vout3 and a predetermined reference voltage Vref are input to the power calculation unit IC3.

The phase adjusting unit 810 is constructed by a resistor R812 and a capacitor C811. A waveform of the output voltage Vout1 of the current transformer CT1 in the voltage detection unit 240 may cause the phase leading amount $\Delta T1$ with respect to the input waveform of the AC voltage from the AC power supply 201. Thus, the phase adjusting unit 810 performs the phase adjustment so as to reduce the phase deviation with respect to the waveform of the output voltage Vout3 of the current transformer CT2 in the current detection unit 850. Details are described later.

In the power calculation unit IC3 serving as a power calculation device, a differential value between the output voltage Vout3 and the reference voltage Vref of the current detection unit 850 is multiplied by a differential value between the output voltage Vout2 and the reference voltage Vref of the phase adjusting unit 810. Then, the power calculation unit IC3 calculates, from an average value of the multiplied value, an average power value of power supplied to the fixing device 100. The power calculation unit IC3 outputs a power signal indicating the calculated average power value to the CPU1 serving as a control unit. The power calculation unit IC3 calculates an average power value of power supplied to the fixing device 100 at a half cycle of the AC power supply 201 and at cycles of integer multiples thereof based on a Zerox signal described later. Similarly, the power calculation unit IC3 may calculate the average power value of power supplied to the fixing device 100 during a predetermined period (for example, a period of one second) which is not in synchronization with the Zerox signal described later.

Now, features of the power detection method of the power supply apparatus 800 according to this embodiment are described. In the above-mentioned voltage detection method according to the first embodiment, the amount of power supplied to the fixing device 100 is calculated based on a square value of a voltage effective value of the voltage detected by the voltage detection unit 240, a resistance value of the heat generation member RH1, and a power duty of power supplied to the fixing device 100. At this time, when the amount of power is calculated, not only the detected voltage but also the resistance value and the power duty are used, and hence the amount of power is calculated indirectly. In contrast, in the power detection method according to this embodiment, the amount of power of the heat generation member RH1 can be directly calculated based on the two detected values, that is, the current value of a current supplied to the fixing device 100 as detected by the current detection unit 850 and the voltage value detected by the voltage detection unit 240. As a result, the amount of power supplied to the fixing device 100 can be calculated with higher accuracy without being affected by an error in the power duty caused by the control of the CPU1 and variation in the resistance value of the heat generation member RH1 of the fixing device 100. Further, when a resistance-temperature coefficient indicating a degree of fluctuation in the resistance value upon the rise in temperature of the heat generation member RH1 is high, the variation in the resistance value of the heat generation member RH1 becomes larger. However, with the configuration according to this embodiment, the supplied power can be calculated with high accuracy even in such a case. Further, according to this embodiment, the amount of power can be detected directly. Therefore, the configuration according to this embodiment can be used as the power detection method even in a case where power is supplied to a load other than the resistor, such as a capacity load or an inductor (for example, in a case where power is supplied to a switching circuit such as an inverter).

[Zero Cross Detection]

FIG. 9A, FIG. 9B, FIG. 9C, and FIG. 9D are diagrams for illustrating voltage waveforms of the AC voltage from the AC power supply 201, the output voltage Vout1 of the current transformer CT1, the output voltage Vout2 of the phase adjusting unit 810, and the output voltage Vout3 of the current transformer CT2 according to this embodiment. Further, FIG. 9E is an illustration of a voltage waveform of a waveform 808 obtained by multiplying the Zerox signal which is the output of the comparator IC2, the output voltage Vout2, and the output voltage Vout3. In this embodiment, the waveform 808 is described as the power waveform of the heat generation member RH1 (value obtained by multiplying a differential value between the output voltage Vout3 and the reference voltage Vref by a differential value between the output voltage Vout2 and the reference voltage Vref).

Figure 9A:
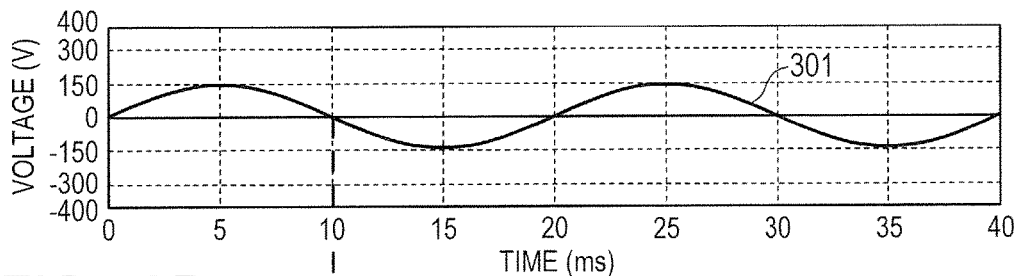
FIG. 9A, FIG. 9B, FIG. 9C, FIG. 9D, and FIG. 9E are diagrams for illustrating input and output waveforms of a zero cross detection circuit according to the third embodiment.
Figure 9B:
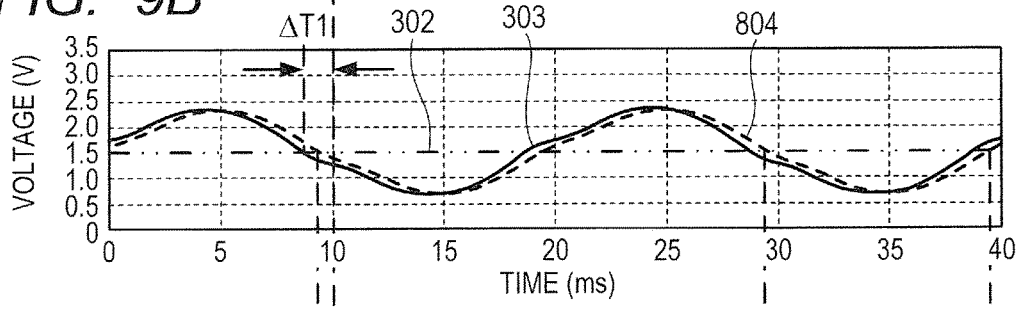
Figure 9C:
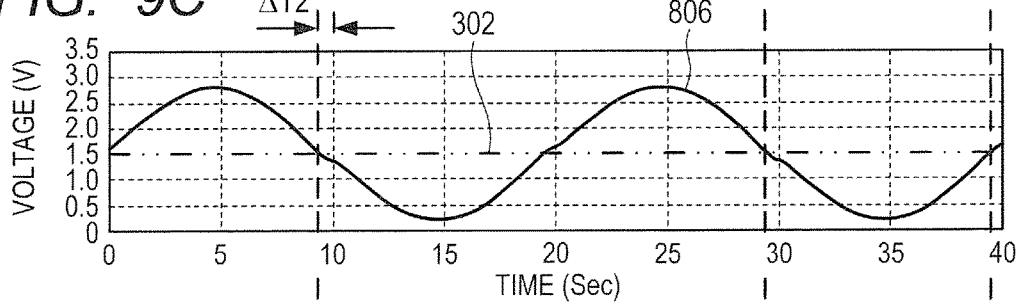

FIG. 9A is a waveform diagram for illustrating the waveform 301 of the input voltage from the AC power supply 201. FIG. 9B is an illustration of the waveform 303 (solid line) which is the voltage waveform of the output voltage Vout1 of the current transformer CT1, the waveform 302 (two-dot chain line) of the reference voltage Vref of the current transformer CT1, and the voltage waveform 804 (broken line) of the output voltage Vout2 of the phase adjusting unit 810. FIG. 9C is an illustration of the voltage waveform 806 (solid line) of the output voltage Vout3 of the current transformer CT2 and the waveform 302 (two-dot chain line) of the reference voltage Vref of the current transformer CT2. As can be seen, under the influence of the secondary side inductance of the current transformer CT2, the voltage waveform 806 of the output voltage Vout3 causes the phase leading amount $\Delta T2$ with respect to the waveform 301 of the AC power supply 201.

In FIG. 9E, the power calculation value obtained by multiplying a differential value between the output voltage Vout2 and the reference voltage Vref by a differential value between the output voltage Vout3 and the reference voltage Vref as represented by the voltage waveform 806 is illustrated as the waveform 808. When the phases of the output voltage Vout2 and output voltage Vout3 are deviated, the power calculation accuracy of the power calculation unit IC3 is degraded. As illustrated in FIG. 9B, the voltage waveform 303 of the output voltage Vout1 causes the phase leading amount $\Delta T1$ with respect to the waveform 301 of the AC power supply 201, and the phase deviation amount is different from the phase leading amount $\Delta T2$ of the voltage waveform 806 of the output voltage Vout3 ($\Delta T1 > \Delta T2$). Therefore, in order to improve the power calculation accuracy of the power calculation unit IC3, the phase adjusting unit 810 performs the phase adjustment so as to reduce the phase deviation between the output voltage Vout1 of the current transformer CT1 and the output voltage Vout3 of the current transformer CT2 (ΔT1-ΔT2).

Figure 9D:
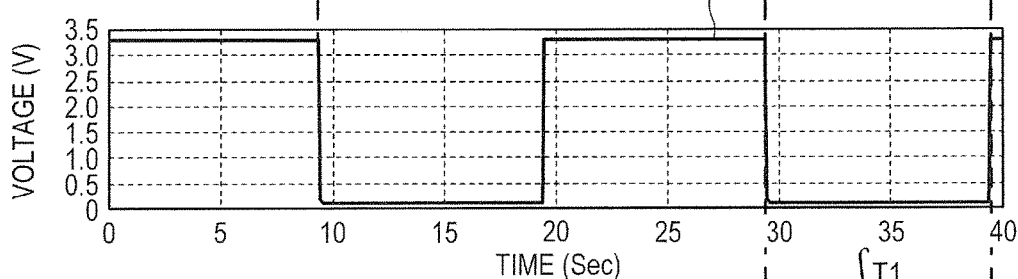
Figure 9E:
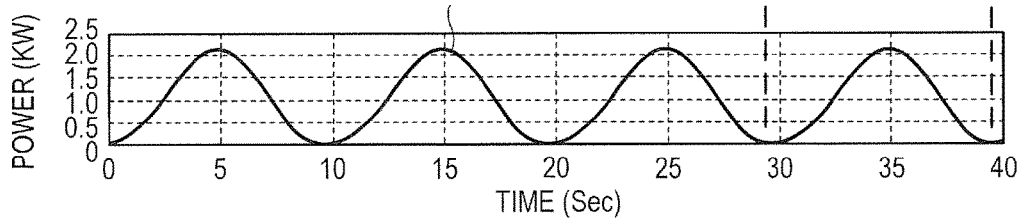

FIG. 9D is an illustration of the voltage waveform 805 of the Zerox signal which is the output of the comparator IC2. The Zerox signal is generated based on the output voltage Vout2 of the phase adjusting unit 810. As a result, the phase leading amount of the Zerox signal with respect to the waveform 301 of the AC voltage from the AC power supply 201 coincides with the phase leading amount ΔT2 in the voltage waveform 804 of the output voltage Vout2 of the phase adjusting unit 810. Thus, with use of the voltage waveform 805 of the Zerox signal causing the similar phase leading amount ΔT2, the integration interval ∫T1 subjected to the power calculation of the power calculation unit 1C3 is determined (in this case, the negative half cycle of the AC power supply 201 is illustrated as an example). With this, the power calculation unit 1C3 can perform calculation of the amount of power supplied to the fixing device 100 during an appropriate period which coincides with the phase leading amount ΔT2. Other than the half cycle (∫T1) of the AC power supply 201, when the average power supplied to the fixing device 100 at cycles of integer multiples of the half cycle of the AC power supply 201, such as the whole cycle of the AC power supply 201, is to be determined, the method of setting the integration interval for calculation with use of the voltage waveform 805 representing the Zerox signal is effective.

As described above, the power supply apparatus 800 according to this embodiment has the following features.

1. With use of the Zerox signal based on the voltage waveform of the output voltage Vout2 of the phase adjusting unit 810, the integration interval for the power calculation at the half cycle of the AC power supply 201 and at the cycles of the integer multiples thereof can be set appropriately.

2. The zero cross circuit having hitherto been required to be constructed on the primary side of the current transformer CT1 can be constructed on the secondary side. Thus, the zero cross circuit can be achieved with a simple circuit configuration.

3. With the phase adjusting unit 810, the phase deviation between the output voltage Vout1 of the current transformer CT1 and the output voltage Vout3 of the current transformer CT2 is reduced, thereby being capable of improving the calculation accuracy for the amount of power.

4. With the current detection unit 850, the current value of a current supplied to the fixing device 100 can be detected, and hence the amount of power can be directly calculated, thereby being capable of improving the calculation accuracy for the amount of power.

As described above, according to this embodiment, the highly accurate power supply control can be performed with a simple circuit configuration.

Next, a fourth embodiment of the present invention is described.

[Configuration of Power Supply Apparatus]

Figure 10:
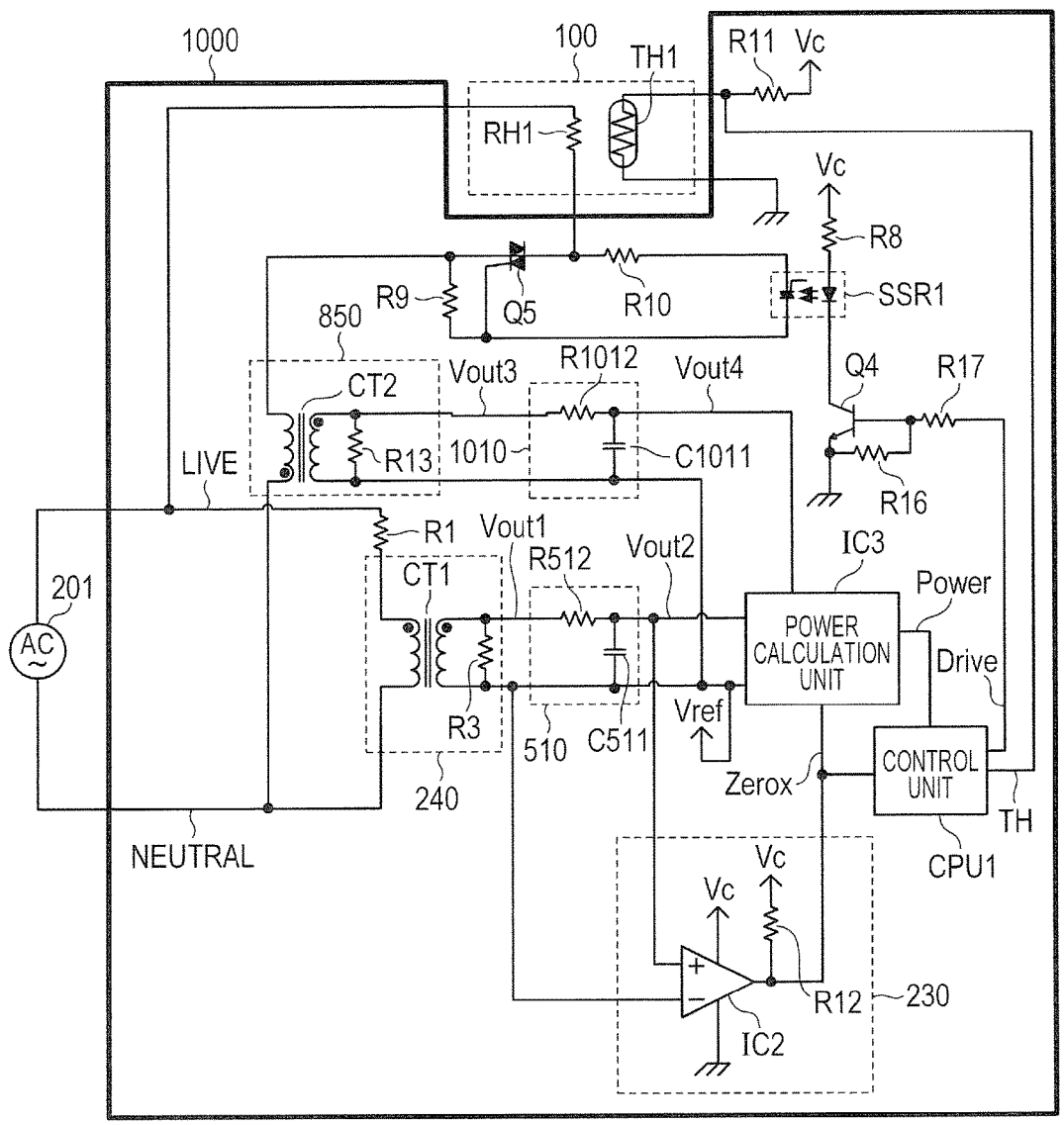
FIG. 10 is a diagram for illustrating a circuit configuration of the power supply apparatus according to the fourth embodiment.

FIG. 10 is a diagram for illustrating a circuit configuration of a power supply apparatus 1000 according to the fourth embodiment. The circuit configuration illustrated in FIG. 10 is different from the circuit configuration according to the third embodiment illustrated in FIG. 8 in that the phase adjusting unit 810 of FIG. 8 is replaced with the phase adjusting unit 510 and a phase adjusting unit 1010 in FIG. 10 in order to improve the calculation accuracy for the amount of power and the zero cross detection accuracy. Although not illustrated in FIG. 10, the configuration provided with the switch SW1 for the power-saving mode as in the second embodiment may be employed to have the power-saving function. Other circuit configuration is the same as the circuit configuration according to the third embodiment illustrated in FIG. 8. Thus, the same reference symbols are used for the same configuration, and description thereof is omitted herein.

A power supply apparatus 1000 according to this embodiment includes the phase adjusting unit 1010 serving as a second phase adjuster device configured to perform phase adjustment for the output voltage Vout3 of the current transformer CT2 of the current detection unit 850. The phase adjusting unit 1010 is constructed by a resistor R1012 and a capacitor C1011. As described above, the voltage waveform of the output voltage Vout3 of the current transformer CT2 causes the phase leading amount ΔT2 with respect to the waveform of the AC voltage from the AC power supply 201. Thus, the phase adjusting unit 1010 inputs the output voltage Vout3 from the current detection unit 850 and outputs an output voltage Vout4 obtained through the phase adjustment for the output voltage Vout3 so as to reduce the phase deviation (ΔT2) with respect to the AC voltage waveform of the AC power supply 201. Meanwhile, as described with reference to FIG. 6A, FIG. 6B, and FIG. 6C, the phase adjusting unit 510 is configured to perform the phase adjustment so as to reduce the phase deviation (ΔT1) with respect to the AC power supply 201 in the voltage waveform of the output voltage Vout1 of the current transformer CT1 in the voltage detection unit 240. That is, the phase adjusting unit 510 is configured to input the output voltage Vout1 from the voltage detection unit 240 and output the output voltage Vout2 obtained through the phase adjustment for the output voltage Vout1. As described above, the phase adjusting unit 1010 and the phase adjusting unit 510 are configured to perform the phase adjustment so as to reduce the phase deviation in the three AC voltage waveforms including the input AC voltage from the AC power supply 201, the output voltage Vout2 output from the phase adjusting unit 510, and the output voltage Vout4 output from the phase adjusting unit 1010.

The power calculation unit IC3 multiplies a differential value between the output voltage Vout4 and the reference voltage Vref of the phase adjusting unit 1010 by a differential value between the output voltage Vout2 and the reference voltage Vref of the phase adjusting unit 510. Then, the power calculation unit IC3 calculates an average value of the multiplied value, to thereby calculate an average power value (average power amount) of power supplied to the fixing device 100.

[Zero Cross Detection]

FIG. 11A, FIG. 11B, FIG. 11C, and FIG. 11D are diagrams for illustrating voltage waveforms of the AC voltage from the AC power supply 201, the output voltage Vout1 of the current transformer CT1, the output voltage Vout2 of the phase adjusting unit 510, and the output voltage Vout3 of the current transformer CT2 according to this embodiment. Further, FIG. 11E is an illustration of a voltage waveform of a waveform 1108 obtained by multiplying the output voltage Vout4 of the phase adjusting unit 1010, the Zerox signal which is output of the comparator IC2, the output voltage Vout2, and the output voltage Vout4.

Figure 11A:
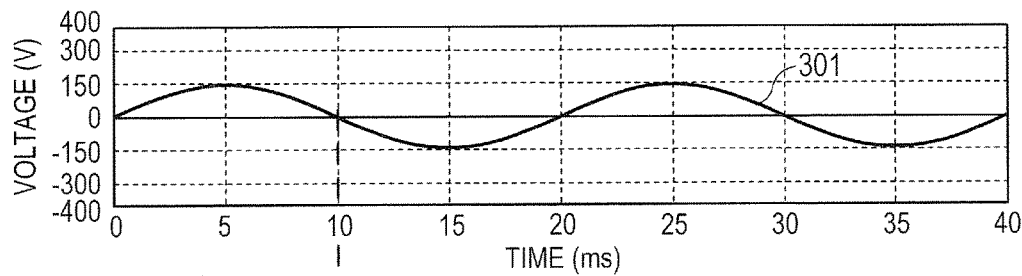
FIG. 11A, FIG. 11B, FIG. 11C, FIG. 11D, and FIG. 11E are diagrams for illustrating input and output waveforms of a zero cross detection circuit according to the fourth embodiment.
Figure 11B:
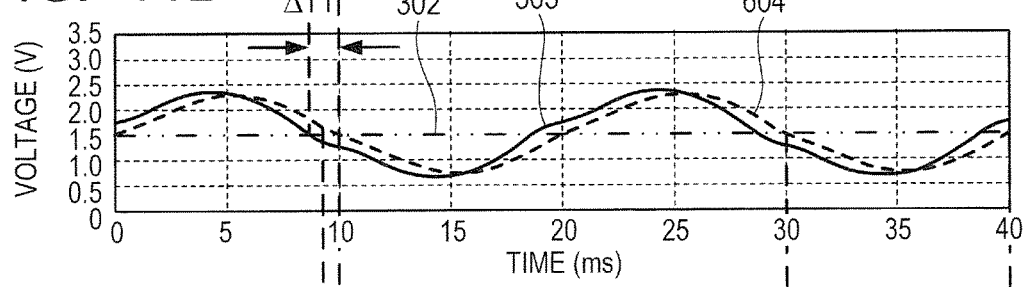
Figure 11C:
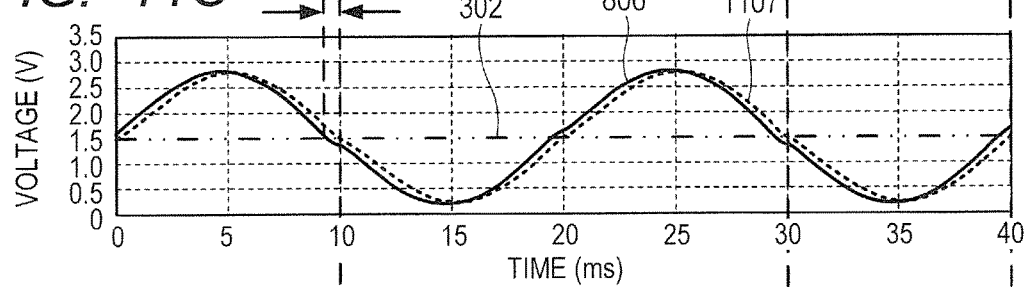

FIG. 11A is a waveform diagram for illustrating the waveform 301 of the input voltage from the AC power supply 201. FIG. 11B is an illustration of the waveform 303 (solid line) of the output voltage Vout1 of the current transformer CT1, the waveform 302 (two-dot chain line) of the reference voltage Vref of the current transformer CT1, and the waveform 604 (broken line) which is the voltage waveform of the output voltage Vout2 of the phase adjusting unit 510. As can be seen from the waveform 604, the phase adjusting unit 510 adjusts the phase leading amount ΔT1 of the output voltage Vout1 of the current transformer CT1 so as to reduce the phase deviation with respect to the voltage waveform of the AC power supply 201. FIG. 11C is an illustration of the voltage waveform 806 (solid line) of the output voltage Vout3 of the current transformer CT2, the waveform 302 (two-dot chain line) of the reference voltage Vref of the current transformer CT2, and a voltage waveform 1107 (broken line) of the output voltage Vout4 of the phase adjusting unit 1010. As can be seen from the voltage waveform 1107, the phase adjusting unit 1010 adjusts the phase leading amount ΔT2 of the output voltage Vout3 of the current transformer CT2 so as to reduce the phase deviation with respect to the voltage waveform of the AC power supply 201. FIG. 11E is an illustration of a power calculation value as the waveform 1108 which is obtained by multiplying a differential value between the output voltage Vout2 and the reference voltage Vref by a differential value between the output voltage Vout4 and the reference voltage Vref as represented by the voltage waveform 1107.

Figure 11D:
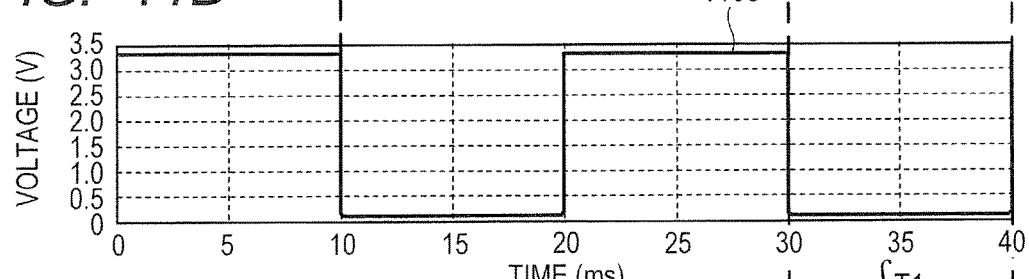
Figure 11E:
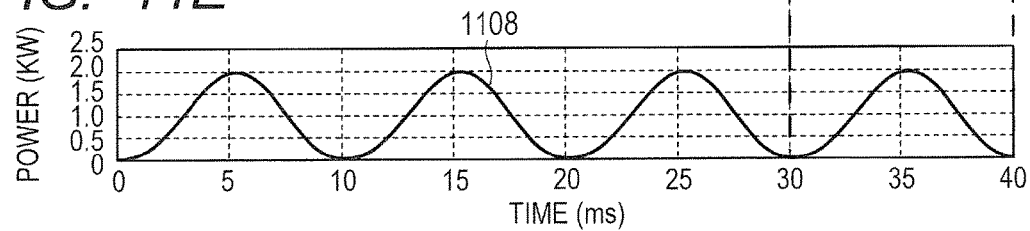

FIG. 11D is an illustration of the waveform 105 which is the voltage waveform of the Zerox signal which is the output of the comparator IC2. As represented by the waveform 1105 of the Zerox signal, the two phase adjusting units 510 and 1010 are used, thereby being capable of reducing the phase deviation between the output voltage Vout2 and the output voltage Vout4 while improving the detection accuracy of the zero cross timing of the AC power supply 201. Thus, the integration interval ∫T1 (in this case, the negative half cycle of the AC power supply 201 is illustrated as an example) for power calculation of the power calculation unit IC3 is determined with use of the waveform 1105 of the Zerox signal causing the similar phase leading in synchronization with the waveform 604. With this, the power calculation unit IC3 can perform calculation of the amount of power to be supplied to the fixing device 100 during an appropriate period. Other than the half cycle (∫T1) of the AC power supply 201, when the square value of the voltage effective value at cycles of integer multiples of the half cycle of the AC power supply 201, such as the whole cycle of the AC power supply 201, is determined, the method of setting the integration interval for calculation with use of the waveform 1105 which is the Zerox signal is effective.

Incidentally, with the configuration according to this embodiment, the waveform of the output voltage Vout3 of the current transformer CT2 may cause slowness (CR delay) under the influence of the phase adjusting unit 1010, and hence the power detection accuracy is degraded in a waveform having a steep current waveform (such as phase control waveform) of current supplied to the heat generation member RH1. Thus, when the power supply apparatus 1000 is used, the method of controlling a current waveform of current supplied to the fixing device 100 to have a sine wave with use of a switching circuit such as an inverter is preferred.

As described above, the power supply apparatus 1000 according to this embodiment has the following features.

1. With use of the Zerox signal based on the output voltage Vout2 of the phase adjusting unit 510, the integration interval for the power calculation at the half cycle of the AC power supply 201 and at the cycles of the integer multiples thereof can be set appropriately.

2. The zero cross circuit having hitherto been required to be constructed on the primary side of the current transformer CT1 can be constructed on the secondary side. Thus, the zero cross circuit can be achieved with a simple circuit configuration.

3. The detection accuracy for the zero cross timing can be improved as in the second embodiment with use of the phase adjusting unit 510.

4. The calculation accuracy for the amount of power can be improved with use of the phase adjusting units 510 and 1010.

As described above, according to this embodiment, the highly accurate power supply control can be performed with a simple circuit configuration.

A fifth embodiment of the present invention is described.

In the fifth embodiment, an example of enabling accurate detection for the zero cross timing even in a case with a broad frequency range of the AC power supply 201 is described. The configuration of the power supply apparatus according to this embodiment is the same as that of the first embodiment illustrated in FIG. 2, and hence description thereof is omitted herein. As described in the first embodiment, the voltage waveform of the output voltage Vout1 represented by the waveform 303 of FIG. 3B causes the phase leading amount ΔT1 with respect to the voltage waveform of the AC power supply 201 represented by the waveform 301 under the influence of the secondary side inductance of the current transformer CT1. As a result, the voltage waveform of the Zerox signal represented by the waveform 305, which is generated based on the output voltage Vout1 represented by the waveform 303, also causes the phase leading amount ΔT1, and hence the detection accuracy for the zero cross timing of the AC power supply 201 is degraded.

Figure 12:
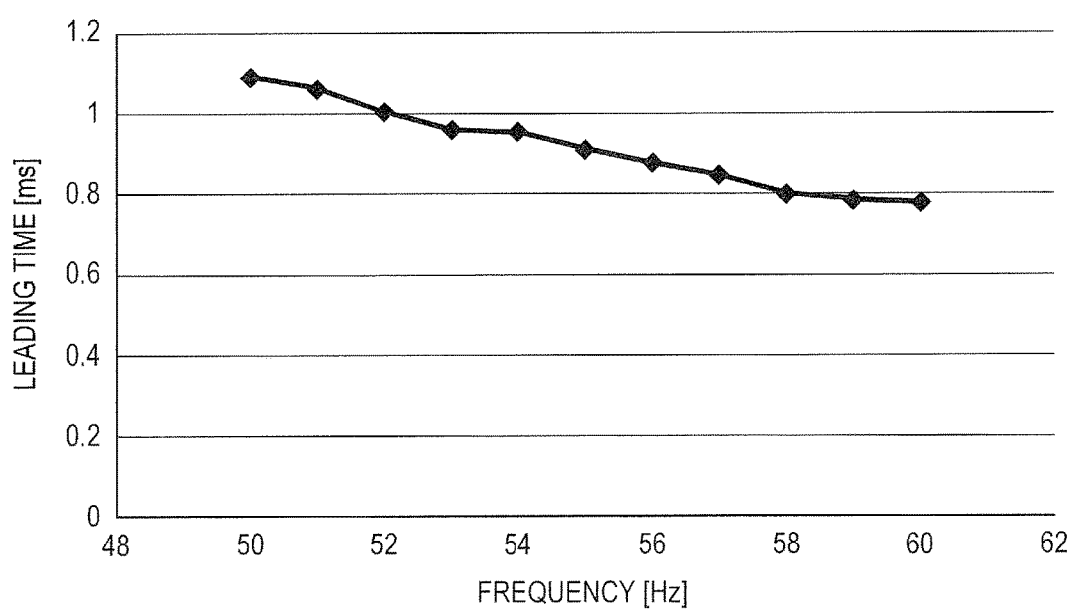
FIG. 12 is a graph for showing a relationship between a phase leading and a frequency of an AC power supply according to the fifth embodiment.

FIG. 12 is a graph for showing a relationship between the phase leading amount ΔT1 in the voltage waveform of the output voltage Vout1 of the current transformer CT1 of the voltage detection unit 240 with respect to the voltage waveform of the AC power supply 201 and a frequency of the AC power supply 201. The horizontal axis of FIG. 12 represents a frequency (unit: Hz (Hertz)) of the AC power supply 201, and the vertical axis represents a phase leading time (unit: ms (millisecond)). In FIG. 12, there is illustrated the phase leading time for each 1 Hz when the frequency of the AC power supply 201 is from 50 Hz to 60 Hz, and the change in the phase leading amount ΔT1 in accordance with the frequency of the AC power supply 201 can be seen. For example, even in a case where the phase adjustment is performed with the phase adjusting unit 510 to coincide with a predetermined frequency (50 Hz) as in the second embodiment, when the frequency of the AC power supply 201 is different from the predetermined frequency of the phase adjusting circuit, the frequency may affect the detection accuracy for the zero cross timing of the AC power supply 201.

Further, as described in the first embodiment, the phase leading amount ΔT1 is changed in accordance with the inductance component and the resistance of the current transformer CT1. When the phase adjusting unit 510 is further arranged, the phase leading amount ΔT1 is changed in accordance with the resistance of the phase adjusting unit 510, a capacitor, and the like. The phase leading amount ΔT1 for each frequency of the AC power supply 201 caused by the inductance and resistance of the current transformer CT1, and by the phase adjusting unit 510 can be calculated in advance. For example, the phase leading amount ΔT1 for each frequency can be calculated by Expression 1.

$$\Delta T1 = (1/(2 \times \pi \times f)) \times \tan^{-1}(Ra/(2 \times \pi \times f \times La)) \quad (1)$$

Herein, f represents a frequency of the AC power supply. Ra represents the secondary side resistance value of the current transformer CT1. La represents a secondary side equivalent inductance value of the current transformer CT1.

Expression 1, and a table including frequency information of the AC power supply 201 and information of the phase leading amount ΔT1 corresponding to the frequency of the AC power supply 201 are stored in advance in a storage unit serving as a storage for the CPU1. The CPU1 calculates with Expression 1 the phase leading amount ΔT1 in accordance with the frequency detected from the zero cross signal input to the CPU1, or acquires the phase leading amount ΔT1 from the table stored in the storage portion. Then, the CPU1 outputs a drive signal at a timing delayed by the phase leading amount ΔT1 to perform the power supply control for the heat generating member RH1 of the fixing device 100.

Figure 13:
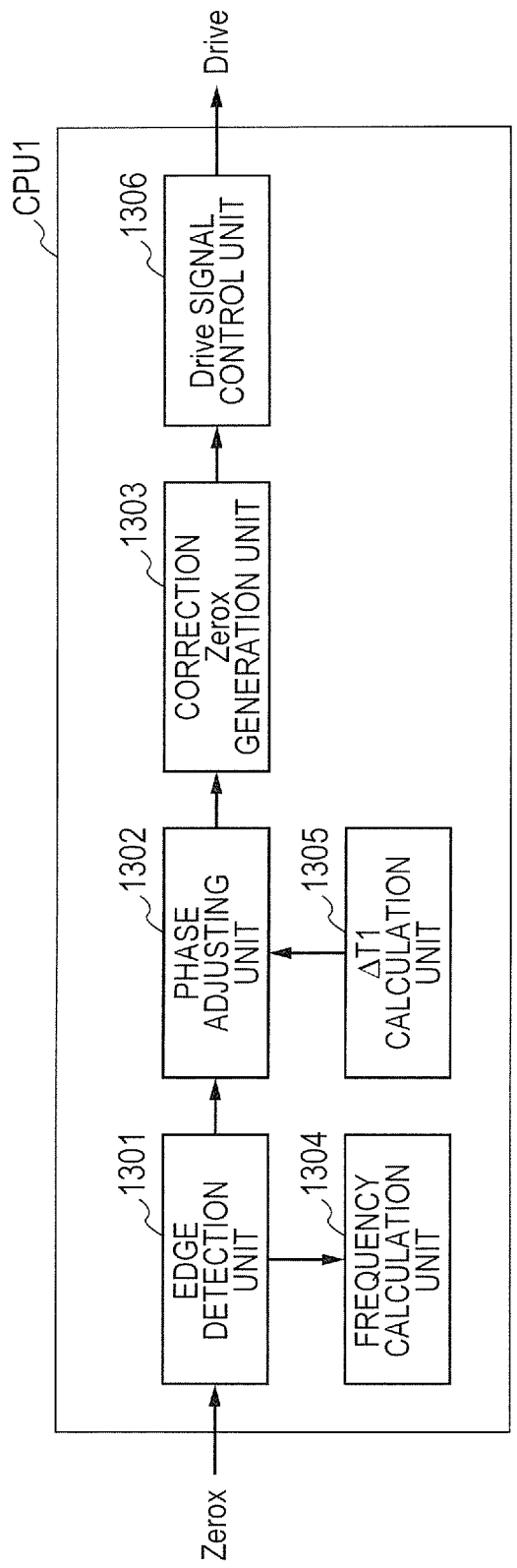
FIG. 13 is a functional block diagram of a control unit according to the fifth embodiment.

FIG. 13 is a functional block diagram for illustrating the zero cross correction control of the CPU1 according to this embodiment. The CPU1 detects a zero cross edge (rising or falling of the Zerox signal) through an edge detection unit 1301 based on the Zerox signal output from the comparator IC2. The CPU1 calculates a frequency of the AC power supply 201 from the detected zero cross edge through a frequency calculation unit 1304 based on the zero cross edge detected through the edge detection unit 1301. As described above, the CPU1 uses Expression 1 for calculation of the phase leading amount ΔT1 or the table including the phase leading amount ΔT1 for each frequency, which are stored in advance in the storage unit, to calculate the phase leading amount ΔT1 through a ΔT1 calculation unit 1305 in accordance with the frequency calculated through the frequency calculation unit 1304. The CPU1 causes, through the phase adjusting unit 1302, a delay by the phase leading amount ΔT1 calculated through the ΔT1 calculation unit 1305 with respect to the zero cross edge detected through the edge detection unit 1301. The CPU1 generates the correction Zerox signal through the correction Zerox generation unit 1303 based on the zero cross edge delayed by the phase leading amount ΔT1 through the phase adjusting unit 1302. The CPU1 outputs, through the drive signal control unit 1306, a drive signal for controlling the power supply to the heat generation member RH1 in accordance with the correction Zerox signal.

In this embodiment, the zero cross correction control is performed by the CPU1. However, for example, a circuit dedicated for the zero cross correction control may be provided to perform the zero cross correction. Further, in this embodiment, the table including phase leading information for each frequency is stored in the storage unit of the CPU1. However, for example, the phase leading information may be stored in a storage device (for example, a non-volatile memory) arranged outside of the CPU1. With respect to an AC signal of the AC power supply 201, a phase difference with the Zerox signal detected through a transmission passage from the AC power supply 201 to the zero cross detection unit 230 may be measured, and the measured phase leading amount ΔT may be stored for each power supply apparatus as a unique value.

In the power supply apparatus 800 of the third embodiment described with reference to FIG. 8, the zero cross correction control by the CPU1 described in this embodiment is applicable to the voltage waveform 804 of the output voltage Vout2 of the phase adjusting unit 810. When the zero cross correction control by the CPU1 is performed with respect to the power supply apparatus 800, the phase deviation of the output voltage Vout3 of the current transformer CT2 can be reduced. Thus, the improvement in the calculation accuracy for the amount of power and the improvement in the detection accuracy for the zero cross timing of the AC power supply 201 can both be achieved. Therefore, the zero cross correction control by the CPU1 is performed in the power supply apparatus 800. Further, the triac coupler SSR2 (zero cross asynchronous type photo-triac coupler) is used in place of the triac coupler SSR1 (zero cross synchronous type photo-triac coupler). With this, the power supply control through the phase control requiring accurate detection for zero cross timing can be performed even with the configuration of the power supply apparatus 800.

As described above, the power supply apparatus according to this embodiment can perform accurate detection for the zero cross timing through the zero cross correction control by the CPU1 even when the frequency range of the AC power supply 201 is broad. Thus, the zero cross signal can be detected more accurately, and hence the power can be turned on at an appropriate timing, thereby being capable of preventing a temperature ripple or the like of the fixing device 100.

As described above, according to this embodiment, the highly accurate power supply control can be performed with a simple circuit configuration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-194770, filed Sep. 30, 2015, which is hereby incorporated by reference herein in its entirety.

What is claimed is:

1. A power supply apparatus configured to supply power to a load, comprising:
 a first line and a second line to each of which an AC voltage is input from an AC power supply;
 a conversion element configured to convert the AC voltage to be input to the first line or the second line into a current corresponding to the AC voltage;
 a voltage detection unit comprising a first current transformer, the first current transformer including a primary winding and a secondary winding, the voltage detection unit being configured to detect an AC voltage output from the secondary winding of the first current transformer through supply of the current converted by the conversion element to the primary winding; and
 a zero cross detection unit configured to detect a zero cross timing of the AC power supply based on the AC voltage detected by the voltage detection unit.

2. A power supply apparatus according to claim 1, wherein the conversion element comprises a resistor, wherein the resistor has one end connected to the first line and another end connected to one end of the primary winding of the first current transformer, and wherein the primary winding has another end connected to the second line.

3. A power supply apparatus according to claim 1, wherein the conversion element comprises a first resistor and a second resistor, wherein the first resistor has one end connected to the first line and another end connected to the one end of the primary winding of the first current transformer, and wherein the second resistor has one end connected to the second line and another end connected to another end of the primary winding of the first current transformer.

4. A power supply apparatus according to claim 1, further comprising a first phase adjusting unit located in a stage following the voltage detection unit and configured to adjust a phase of the AC voltage waveform output from the voltage detection unit,
wherein the first phase adjusting unit is configured to adjust a phase of the AC voltage waveform output from the voltage detection unit so as to reduce a phase difference with an AC voltage waveform of the AC power supply.

5. A power supply apparatus according to claim 4, wherein the zero cross detection unit is configured to detect a zero cross timing of the AC power supply based on the AC voltage waveform subjected to phase adjustment by the first phase adjusting unit.

6. A power supply apparatus according to claim 1, further comprising a current detection unit configured to detect a current supplied to the load,
wherein the current detection unit comprises a second current transformer including a primary winding and a secondary winding and is configured to detect a current value of the current based on a voltage of an AC voltage waveform output to a secondary side of the second current transformer in accordance with the current through supply of the current supplied to the load to the primary winding.

7. A power supply apparatus according to claim 6,
wherein the load has one end connected to the first line and another end connected to one end of the primary winding of the second current transformer, and
wherein the primary winding has the another end connected to the second line.

8. A power supply apparatus according to claim 6, wherein the first phase adjusting unit is configured to adjust a phase of the AC voltage waveform output from the voltage detection unit so as to reduce a phase difference with the AC voltage waveform output from the current detection unit.

9. A power supply apparatus according to claim 6, further comprising a second phase adjusting unit located in a stage following the current detection unit and configured to adjust a phase of the AC voltage waveform output from the current detection unit,
wherein the second phase adjusting unit is configured to adjust a phase of the AC voltage waveform output from the current detection unit so as to reduce a phase difference with the AC voltage waveform of the AC power supply.

10. A power supply apparatus according to claim 9, wherein the first phase adjusting unit is configured to adjust a phase of the AC voltage waveform output from the voltage detection unit so as to reduce a phase difference with the AC voltage waveform output from the second phase adjusting unit.

11. A power supply apparatus according to claim 6, further comprising a power calculation unit configured to calculate power supplied to the load,
wherein the power calculation unit is configured to calculate an amount of power supplied to the load from the AC power supply based on a current value of a current supplied to the load, which is detected based on the AC voltage waveform output from the current detection unit, and a voltage value of a voltage of the AC power supply, which is detected based on the AC voltage waveform output from the first phase adjusting unit.

12. A power supply apparatus according to claim 9, further comprising a power calculation unit configured to calculate power supplied to the load,
wherein the power calculation unit is configured to calculate an amount of power supplied to the load from the AC power supply based on a current value of a current supplied to the load, which is detected based on the AC voltage waveform output from the second phase adjusting unit, and a voltage value of a voltage of the AC power supply, which is detected based on the AC voltage waveform output from the first phase adjusting unit.

13. A power supply apparatus according to claim 1, further comprising a control unit configured to control supply of power to the load,
wherein the control unit is configured to calculate a frequency of the AC power supply based on a zero cross timing detected by the zero cross detection unit and use a phase leading amount of the AC voltage waveform, which is output from the voltage detection unit, corresponding to the calculate frequency to adjust the zero cross timing of the AC voltage waveform.

14. A power supply apparatus according to claim 13, further comprising a storage unit configured to store the phase leading amount of the AC voltage waveform, which is output from the voltage detection unit, corresponding to the frequency of the AC power supply,
wherein the control unit is configured to obtain the phase leading amount corresponding to the calculated frequency from the storage unit.

15. A power supply apparatus according to claim 13, wherein the control unit is configured to calculate the phase leading amount of the AC voltage waveform corresponding to the calculated frequency based on a frequency of the AC power supply and on an inductance value and a resistance value on the secondary side of the first current transformer.

16. A power supply apparatus according to claim 1, further comprising a voltage calculation unit configured to calculate a voltage of the AC power supply,
wherein the voltage calculation unit is configured to calculate a voltage of the AC power supply based on a voltage of the AC power supply detected by the voltage detection unit and a zero cross timing of the AC power supply detected by the zero cross detection unit.

17. A power supply apparatus according to claim 16, further comprising a voltage calculation unit configured to calculate a voltage of the AC power supply,
wherein the voltage calculation unit is configured to calculate a voltage of the AC power supply based on a voltage of the AC voltage waveform adjusted by the first phase adjusting unit and a zero cross timing of the AC power supply detected by the zero cross detection unit.

18. A power supply apparatus according to claim 16, wherein the amount of power supplied to the load is calculated based on a voltage calculated by the voltage calculation unit, a resistance value of the load, and a power duty of power supplied to the load.

19. A power supply apparatus according to claim 1, further comprising a switching unit configured to switch between connection and disconnection of a current path for a current which flows through the primary winding of the first current transformer,
wherein the switching unit is configured to disconnect the current path when the power supply apparatus is in a power-saving state.

20. A fixing device configured to fix an image onto a recording material, comprising:
a heat generation member configured to heat an image to fix the image onto a recording material;

a power supply apparatus configured to supply power to the heat generation member, the power supply apparatus comprising:

a first line and a second line to each of which an AC voltage is input from an AC power supply;

a conversion element configured to convert the AC voltage to be input to the first line or the second line into a current corresponding to the AC voltage;

a voltage detection unit comprising a first current transformer, the first current transformer including a primary winding and a secondary winding, the voltage detection unit being configured to detect an AC voltage output from the secondary winding of the first current transformer through supply of the current converted by the conversion element to the primary winding; and a zero cross detection unit configured to detect a zero cross timing of the AC power supply based on the AC voltage detected by the voltage detection unit.

21. An image forming apparatus, comprising:

a fixing unit comprising a heat generation member to which power is supplied from an AC power supply and being configured to heat an image to fix the image onto a recording material; and a power supply apparatus configured to supply power to the fixing unit, the power supply apparatus comprising:

a first line and a second line to each of which an AC voltage is input from an AC power supply;

a conversion element configured to convert the AC voltage to be input to the first line or the second line into a current corresponding to the AC voltage;

a voltage detection unit comprising a first current transformer, the first current transformer including a primary winding and a secondary winding, the voltage detection unit being configured to detect an AC voltage output from the secondary winding of the first current transformer through supply of the current converted by the conversion element to the primary winding; and a zero cross detection unit configured to detect a zero cross timing of the AC power supply based on the AC voltage detected by the voltage detection unit.

\* \* \* \* \*